(12) United States Patent
Kasa et al.

(10) Patent No.: US 12,200,346 B2
(45) Date of Patent: *Jan. 14, 2025

(54) INFORMATION PROCESSING DEVICE, MEDIUM AND METHOD FOR USING A TOUCH SCREEN DISPLAY TO CAPTURE AT LEAST ONE IMAGE

(71) Applicant: Sony Group Corporation, Tokyo (JP)

(72) Inventors: Masanori Kasa, Kanagawa (JP); Yohei Nakajima, Kanagawa (JP); Tomoko Takahashi, Chiba (JP); Junichirou Sakata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,786

(22) Filed: Sep. 23, 2022

(65) Prior Publication Data
US 2023/0020102 A1 Jan. 19, 2023

Related U.S. Application Data

(63) Continuation of application No. 16/543,244, filed on Aug. 16, 2019, now Pat. No. 11,490,003, which is a
(Continued)

(30) Foreign Application Priority Data

Aug. 12, 2014 (JP) ................. 2014-164154

(51) Int. Cl.
*H04N 23/62* (2023.01)
*G06F 3/04847* (2022.01)
(Continued)

(52) U.S. Cl.
CPC ......... *H04N 23/62* (2023.01); *G06F 3/04847* (2013.01); *G06F 3/04883* (2013.01);
(Continued)

(58) Field of Classification Search
None
See application file for complete search history.

(56) References Cited

U.S. PATENT DOCUMENTS

| 5,923,908 A | 7/1999 | Schrock et al. |
| 6,101,339 A | 8/2000 | Miki et al. |

(Continued)

FOREIGN PATENT DOCUMENTS

| CN | 102314309 A | 1/2012 |
| CN | 103227898 A | 7/2013 |

(Continued)

OTHER PUBLICATIONS

Extended European Search Report issued Feb. 20, 2018 for corresponding European Application No. 15832493.9.
(Continued)

*Primary Examiner* — Cynthia Segura
(74) *Attorney, Agent, or Firm* — Michael Best & Friedrich LLP

(57) ABSTRACT

An information processing device, a program, and an information processing method are provided, capable of instructing an imaging device to start and end a predetermined operation through an operation via a GUI. The information processing device includes: a display control unit configured to control display of a slider on a display unit, the slider being configured such that a display object is movable between predetermined positions; and a process control unit configured to instruct an imaging unit to control photography in a predetermined mode when the process control unit receives an operation of moving the display object.

33 Claims, 18 Drawing Sheets

Related U.S. Application Data continuation of application No. 15/328,307, filed as application No. PCT/JP2015/067368 on Jun. 16, 2015, now Pat. No. 10,425,575.

(51) Int. Cl.
| | |
|---|---|
| *G06F 3/04883* | (2022.01) |
| *H04N 23/63* | (2023.01) |
| *H04N 23/661* | (2023.01) |
| *H04N 23/663* | (2023.01) |
| *H04N 23/667* | (2023.01) |
| *H04N 23/67* | (2023.01) |
| *H04N 23/73* | (2023.01) |

(52) U.S. Cl.
CPC ......... *H04N 23/631* (2023.01); *H04N 23/633* (2023.01); *H04N 23/661* (2023.01); *H04N 23/663* (2023.01); *H04N 23/667* (2023.01); *H04N 23/67* (2023.01); *H04N 23/73* (2023.01)

(56) References Cited

U.S. PATENT DOCUMENTS

| | | | |
|---|---|---|---|
| 7,477,293 B2 | 1/2009 | Koshikawa | |
| 9,088,719 B2* | 7/2015 | Yi | G06F 3/0486 |
| 9,088,760 B2 | 7/2015 | Fujita | |
| 9,131,144 B2 | 9/2015 | Park | |
| 9,137,437 B2 | 9/2015 | Choi et al. | |
| 9,671,952 B2 | 6/2017 | Takami | |
| 9,720,587 B2 | 8/2017 | Matsuki | |
| 9,800,785 B2 | 10/2017 | Ishihara et al. | |
| 9,819,854 B2* | 11/2017 | Cho | H04N 23/62 |
| 9,830,121 B2* | 11/2017 | Sirpal | G06F 3/00 |
| 9,942,464 B2 | 4/2018 | Voss | |
| 10,425,575 B2 | 9/2019 | Kasa | |
| 10,462,278 B2 | 10/2019 | Masuoka et al. | |
| 10,466,951 B2* | 11/2019 | Sirpal | G06F 1/1637 |
| 10,719,163 B2 | 7/2020 | Lv et al. | |
| 10,764,446 B2 | 9/2020 | Kasa | |
| 11,490,003 B2* | 11/2022 | Kasa | H04N 23/73 |
| 2006/0072028 A1 | 4/2006 | Hong | |
| 2007/0025711 A1 | 2/2007 | Marcus | |
| 2007/0206944 A1 | 9/2007 | Ieda | |
| 2008/0204402 A1 | 8/2008 | Hirata et al. | |
| 2009/0244357 A1 | 10/2009 | Huang | |
| 2011/0019058 A1 | 1/2011 | Sakai et al. | |
| 2011/0115932 A1 | 5/2011 | Shin et al. | |
| 2011/0221948 A1 | 9/2011 | Saito | |
| 2011/0246943 A1* | 10/2011 | Fujibayashi | G06F 3/048 715/833 |
| 2011/0267530 A1 | 11/2011 | Chun | |
| 2012/0009896 A1 | 1/2012 | Bandyopadhyay et al. | |
| 2012/0011456 A1* | 1/2012 | Noda | H04N 21/47 715/847 |
| 2012/0026118 A1 | 2/2012 | Hackborn | |
| 2012/0069231 A1* | 3/2012 | Chao | H04N 23/631 348/333.01 |
| 2012/0079386 A1* | 3/2012 | Kim | G06F 3/0488 715/720 |
| 2012/0113216 A1 | 5/2012 | Seen et al. | |
| 2012/0182325 A1 | 7/2012 | Hayashi | |
| 2012/0229411 A1 | 9/2012 | Arai | |
| 2012/0280922 A1 | 11/2012 | Lee et al. | |
| 2012/0284674 A1 | 11/2012 | Geng et al. | |
| 2013/0002802 A1 | 1/2013 | Mock | |
| 2013/0055119 A1* | 2/2013 | Luong | H04N 23/62 715/764 |
| 2013/0064533 A1 | 3/2013 | Nakata | |
| 2013/0076963 A1* | 3/2013 | Sirpal | G06F 1/1683 348/333.01 |
| 2013/0093709 A1* | 4/2013 | Fujibayashi | G06F 3/041 345/173 |
| 2013/0093967 A1 | 4/2013 | Osborne et al. | |
| 2013/0141362 A1 | 6/2013 | Asanuma | |
| 2013/0191910 A1 | 7/2013 | Dellinger et al. | |
| 2013/0194215 A1 | 8/2013 | Toida et al. | |
| 2013/0201211 A1* | 8/2013 | Kim | G06T 11/60 345/632 |
| 2013/0222668 A1 | 8/2013 | Anderson | |
| 2013/0271637 A1 | 10/2013 | Park | |
| 2014/0033100 A1 | 1/2014 | Noda et al. | |
| 2014/0043211 A1 | 2/2014 | Park | |
| 2014/0063313 A1* | 3/2014 | Choi | H04N 23/62 348/333.02 |
| 2014/0078371 A1* | 3/2014 | Kinoshita | G06F 3/0488 348/333.02 |
| 2014/0195947 A1 | 7/2014 | Yang et al. | |
| 2015/0009391 A1 | 1/2015 | Kim et al. | |
| 2015/0156552 A1 | 6/2015 | Wayans et al. | |
| 2015/0172534 A1 | 6/2015 | Miyakawa et al. | |
| 2015/0334291 A1 | 11/2015 | Cho et al. | |
| 2015/0350535 A1 | 12/2015 | Voss | |
| 2016/0044234 A1 | 2/2016 | Huang et al. | |
| 2016/0065832 A1 | 3/2016 | Kim et al. | |
| 2016/0105613 A1 | 4/2016 | Takanashi | |
| 2016/0156830 A1 | 6/2016 | Eshita | |
| 2016/0191791 A1 | 6/2016 | Tokairin | |
| 2016/0301849 A1 | 10/2016 | E | |
| 2017/0085775 A1 | 3/2017 | Ito et al. | |
| 2017/0272583 A1 | 9/2017 | Kasa et al. | |
| 2017/0289462 A1 | 10/2017 | Eum et al. | |
| 2017/0339344 A1 | 11/2017 | Ishihara et al. | |
| 2017/0359504 A1 | 12/2017 | Manzari et al. | |
| 2017/0359505 A1 | 12/2017 | Manzari et al. | |
| 2018/0069983 A1* | 3/2018 | Cho | H04N 23/632 |
| 2018/0107360 A1* | 4/2018 | Kim | G06F 3/04817 |
| 2018/0302568 A1 | 10/2018 | Kim et al. | |
| 2019/0174069 A1 | 6/2019 | Poindexter, Jr. | |
| 2020/0007779 A1 | 1/2020 | Ogawa | |

FOREIGN PATENT DOCUMENTS

| | | |
|---|---|---|
| CN | 103620541 A | 3/2014 |
| JP | 2004-312378 A | 11/2004 |
| JP | 2005-210589 A | 8/2005 |
| JP | 2006-135582 A | 5/2006 |
| JP | 2009-025582 A | 2/2009 |
| JP | 2009219149 A | 9/2009 |
| JP | 2012-018535 A | 1/2012 |
| JP | 2013-058958 A | 3/2013 |
| JP | 2013-070303 A | 4/2013 |
| JP | 2014006800 A | 1/2014 |

OTHER PUBLICATIONS

Japanese Office Action issued Jan. 8, 2019 for corresponding Japanese Application No. 2016-542515.
Chinese Office Action issued May 20, 2019 for corresponding Chinese Application No. 201580039947.6.
Chinese Office Action issued Dec. 20, 2019 for corresponding Chinese Application No. 201580039947.6.
Korean Office Action dated Jun. 29, 2021 for corresponding Korean Application No. 10-2017-7000723.
European Communication Pursuant to Article 94(3) EPC dated Feb. 23, 2022 for correspondence 15832493.9.

* cited by examiner

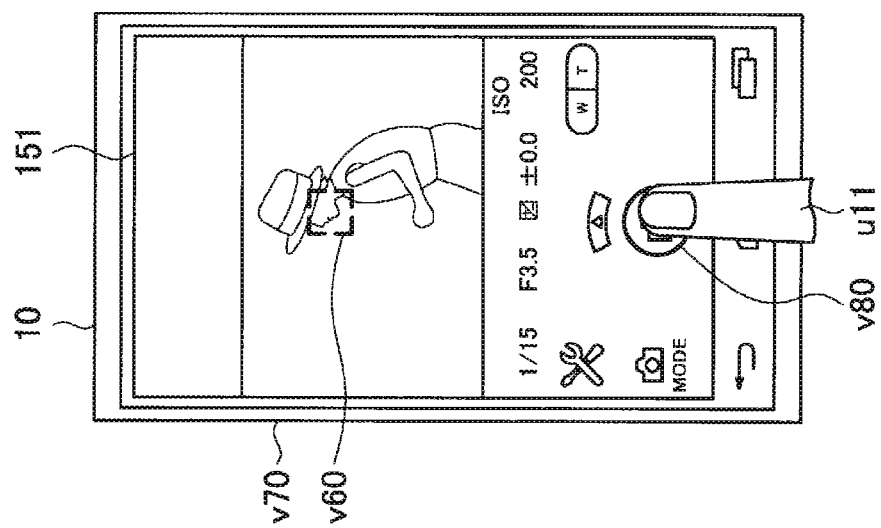
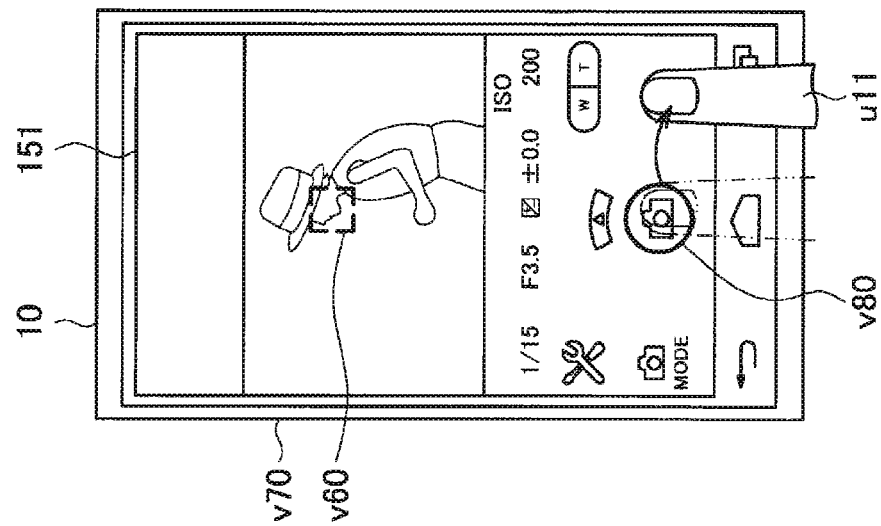
FIG.6

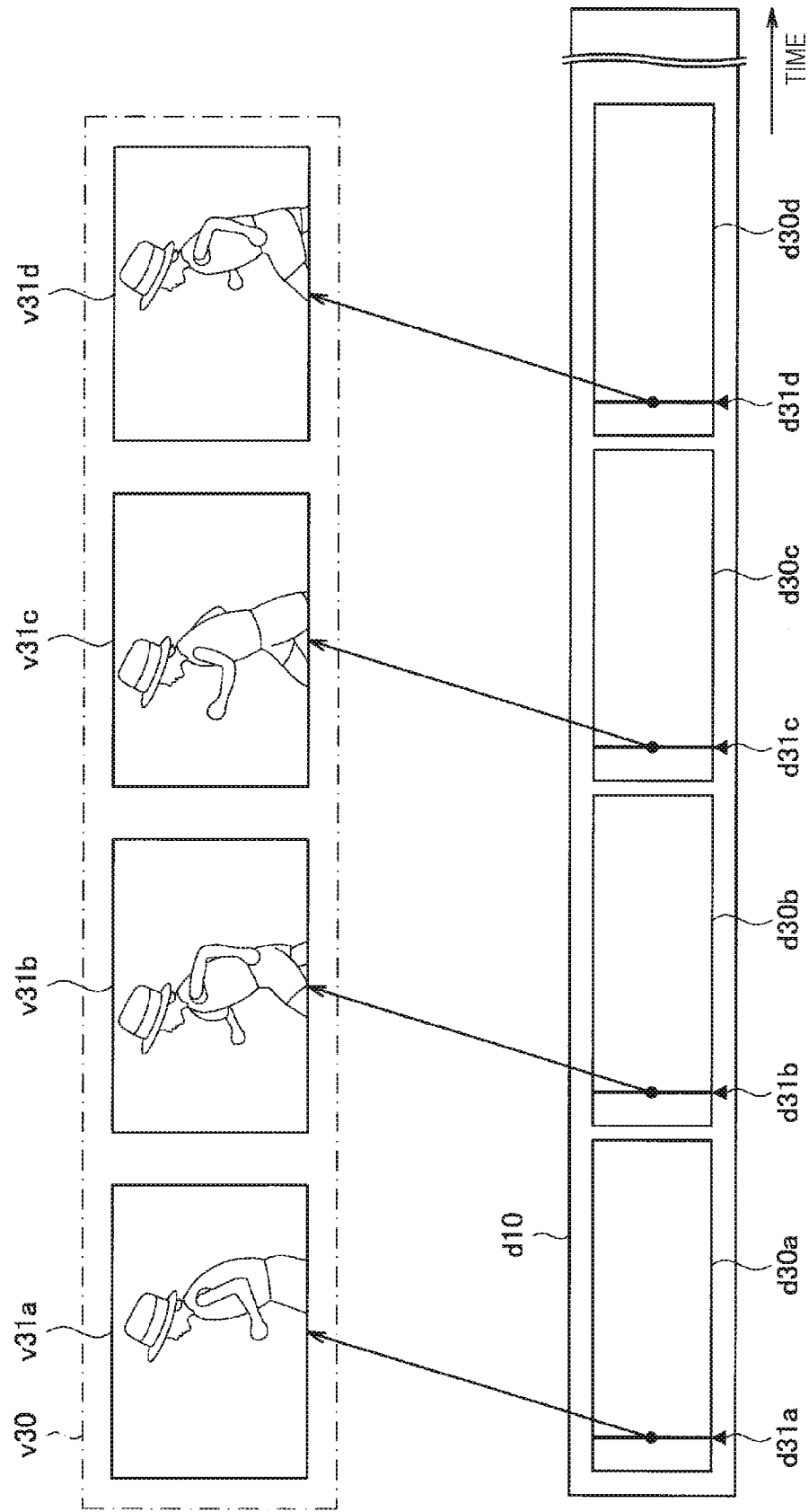

INFORMATION PROCESSING DEVICE, MEDIUM AND METHOD FOR USING A TOUCH SCREEN DISPLAY TO CAPTURE AT LEAST ONE IMAGE

CROSS REFERENCE TO RELATED APPLICATIONS

This present application is a continuation application of application Ser. No. 16/543,244, filed Aug. 16, 2019, which is a is a continuation application of application Ser. No. 15/538,307, filed Jan. 23, 2017, now U.S. Pat. No. 10,425,575, issued on Sep. 24, 2019, which is a US Nationalization of PCT/JP2015-067368 filed Jun. 16, 2015 and claims priority to Japanese Priority Patent Application JP 2014-164154 filed Aug. 12, 2014, the entire contents of which are incorporated herein by reference.

TECHNICAL FIELD

The present disclosure relates to an information processing device, a program, and an information processing method.

BACKGROUND ART

Some devices such as digital still cameras or digital video cameras (hereinafter generally referred to as "digital cameras" in some cases) can connect to information processing terminals such as smartphones via wireless networks. As a communication standard for connecting different devices via wireless networks in this way, for example, wireless fidelity (Wi-Fi) (registered trademark) can be exemplified.

In addition, in recent years, functions of operating imaging devices such as digital cameras via information processing terminals are provided by connecting the imaging devices to the information processing terminals via networks. Some of the imaging devices in which input and output interfaces installed in the imaging devices are restricted (for example, simplified or excluded) have been provided on the premise that information processing terminals connected via networks are used as main user interfaces (UIs) because such functions are provided.

CITATION LIST

Patent Literature

Patent Literature 1: JP 2009-25582A

DISCLOSURE OF INVENTION

Technical Problem

In imaging devices such as digital cameras, start and end of a predetermination operation are controlled in some cases in accordance with a state in which a shutter button is pushed halfway (a so-called half-push state), a state in which the shutter button is pushed fully (a so-called full-push state), and a state in which the shutter button is not pushed.

For example, when a plurality of still images are captured while an autofocus (AF) function (a case of so-called continuous shoot) is operated, an imaging device starts capturing, that is, continuous shoot, of images by operating the AF function in the half-push state and transitioning to the full-push state. Then, the imaging device continues the started continuous shoot as long as the full-push state is maintained, and ends the continued continuous shoot with cancellation of the full-push state, that is, transition to the state in which the shutter button is not pushed.

On the other hand, when an imaging device is operated via an information processing terminal, an interface such as a touch panel of the information processing terminal is used as a UI for operating the imaging device in some cases without being limited to a so-called button type interface such as a shutter button. Therefore, even in an operation via a graphical user interface (GUI), such as an operation via a touch panel, there is a request for a structure in which start and end of a predetermined operation (for example, continuous shoot) on an imaging device can be instructed through an intuitive operation as in the above-described operation via the shutter button.

Accordingly, the present disclosure proposes an information processing device, a program, and an information processing method capable of instructing an imaging device to start and end a predetermined operation through an operation via a GUI.

Solution to Problem

According to the present disclosure, there is provided an information processing device including: a display control unit configured to control display of a slider on a display unit, the slider being configured such that a display object is movable between predetermined positions; and a process control unit configured to instruct an imaging unit to control photography in a predetermined mode when the process control unit receives an operation of moving the display object.

According to the present disclosure, there is provided a program causing a computer to execute: controlling display of a slider on a display unit, the slider being configured such that a display object is movable between predetermined positions; and instructing an imaging unit to control photography in a predetermined mode when an operation of moving the display object is received.

According to the present disclosure, there is provided an information processing method including: controlling display of a slider on a display unit, the slider being configured such that a display object is movable between predetermined positions; and instructing, by a processor, an imaging unit to control photography in a predetermined mode when an operation of moving the display object is received.

Advantageous Effects of Invention

The present disclosure described above provides an information processing device, a program, and an information processing method capable of instructing an imaging device to start and end a predetermined operation through an operation via a GUI.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram illustrating an example of an operation method when one still image is captured while the AF function in the imaging device is operated through an operation via the GUI.

FIG. 20 is an explanatory diagram illustrating an overview of an information processing system according to Example 3.

MODE(S) FOR CARRYING OUT THE INVENTION

Figure 1:
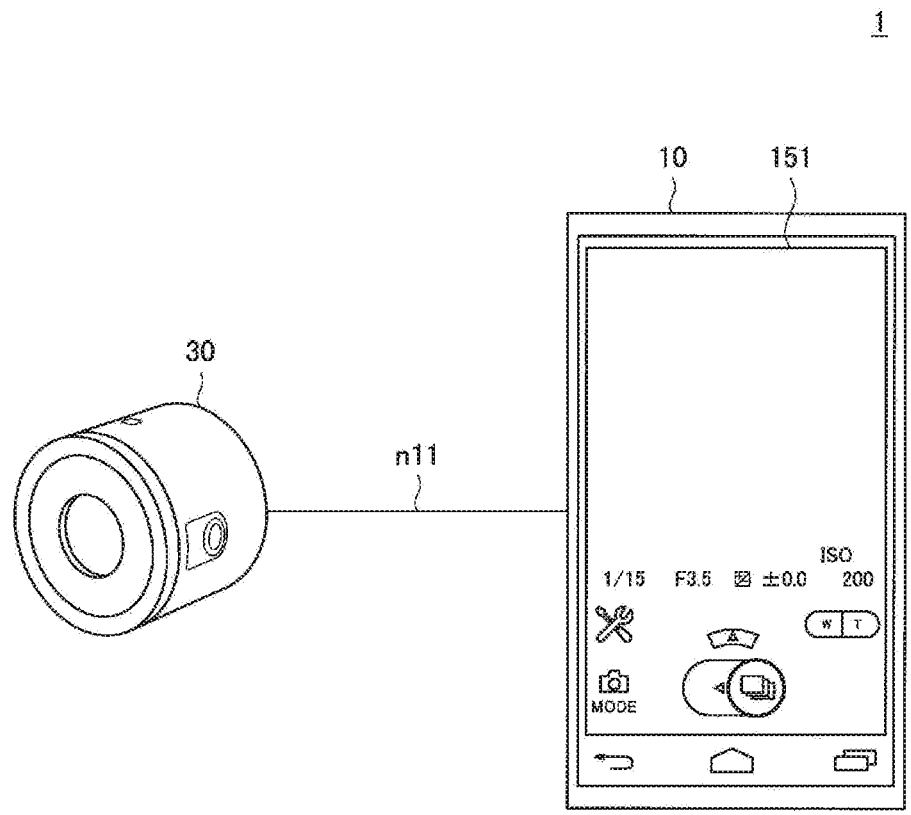
FIG. 1 is an explanatory diagram illustrating an example of a schematic system configuration of an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, the description will be made in the following order.

1. First Embodiment
1.1. System configuration
1.2. Functional configuration
1.3. Hardware configuration
1.4. Conclusion
2. Second Embodiment
2.1. Overview
2.2. Configuration of operation screen and operation method
2.3. Process
2.4. Examples
2.4.1. Example 2-1: example of slider
2.4.2. Example 2-2: cooperation with operation unit of imaging device
2.5. Conclusion
3. Third Embodiment
3.1. Overview
3.2. Process
3.3. Example 3
3.4. Conclusion
4. Conclusion

1. FIRST EMBODIMENT

1.1. System Configuration

First, a schematic configuration of an information processing system according to a first embodiment of the present disclosure will be described with reference to FIG. 1. FIG. 1 is an explanatory diagram illustrating an example of a schematic system configuration of an information processing system 1 according to the present embodiment.

As illustrated in FIG. 1, the information processing system 1 according to the present embodiment includes an information processing terminal 10 and an imaging device 30. The imaging device 30 is equivalent to a device that captures an image such as a still image or a moving image, as in a so-called digital camera. In addition, the information processing terminal 10 is equivalent to a user terminal, as in a so-called smartphone.

The information processing terminal 10 and the imaging device 30 are connected to be able to communicate with each other via a wireless network n11. As a specific example of the network n11, a network based on the Wi-Fi (registered trademark) standard can be exemplified. For example, when the network n11 based on the Wi-Fi (registered trademark) standard is applied, one of the information processing terminal 10 and the imaging device 30 operates as an access point and the other thereof is connected to the one thereof as a station.

In particular, the information processing terminal 10 according to the present embodiment is configured to be able to control an operation (for example, an operation related to capturing of an image) of the imaging device 30 connected via the network n11. That is, the imaging device 30 can capture an image such as a moving image or a still image based on an instruction transmitted from the information processing terminal 10 via the network n11. Moreover, the function can be realized, for example, by installing an application generated using an application programming interface (API) that controls an operation of the imaging device 30 via the network in the information processing terminal 10. Of course, an application that realizes the function may be embedded in advance in the information processing terminal 10.

Moreover, an example of a case in which the information processing terminal 10 is a smartphone will be described below. However, the information processing terminal 10 is not necessarily limited to a smartphone. As a specific example, a device which can be connected to the imaging device 30 via a wireless network, as in a remote controller, may be applied as the information processing terminal 10.

Figure 2:
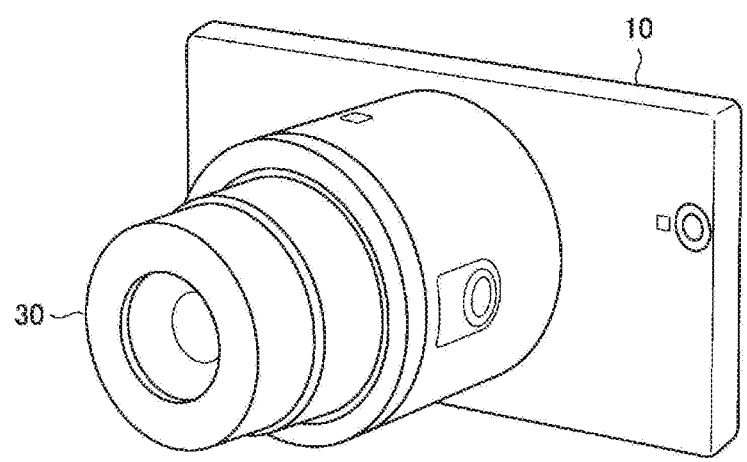
FIG. 2 is an explanatory diagram illustrating an example of an imaging device in which an input and output interface is restricted.

With such a configuration, a device in which an input and output interface is restricted (for example, simplified or excluded) can be used as the imaging device 30. For example, FIGS. 1 and 2 illustrate an example of the imaging device 30 in which an input and output interface is restricted. In the example illustrated in FIG. 2, an output interface such as a liquid crystal display is excluded from the imaging device 30 and an operation interface is also restricted on the premise that the information processing terminal 10 is used as an interface for an operation related to capturing of an image.

In addition, the imaging device 30 may be configured to be detachably mounted on the information processing terminal 10. In the example illustrated in FIG. 2, as a specific example, an attachment fixing (or holding) the imaging device 30 to the information processing terminal 10 is installed in the information processing terminal 10 or the imaging device 30 so that the imaging device 30 can be mounted on the information processing terminal 10.

In this way, when the imaging device 30 is mounted on the information processing terminal 10, a user can use the imaging device 30 like a so-called digital camera in which an input and output interface is not restricted.

In addition, as another example, the imaging device 30 and the information processing terminal 10 connected via the network n11 may be used in a mutually separated state (that is, a state in which the imaging device 30 is not mounted on the information processing terminal 10). In this way, when the imaging device 30 and the information processing terminal 10 are used in the mutually separated state, the imaging device 30 and the information processing terminal 10 can also operate without restriction on mutual physical positions.

Moreover, the example of the imaging device 30 illustrated in FIGS. 1 and 2 is merely an example and the configuration of the imaging device 30 according to the present embodiment is not necessarily limited. That is, for example, a general imaging device including an input and output interface such as a liquid crystal display may be used as the imaging device 30 as long as the device can communicate with the information processing terminal 10 via the network n11.

1.2. Functional Configuration

Figure 3:
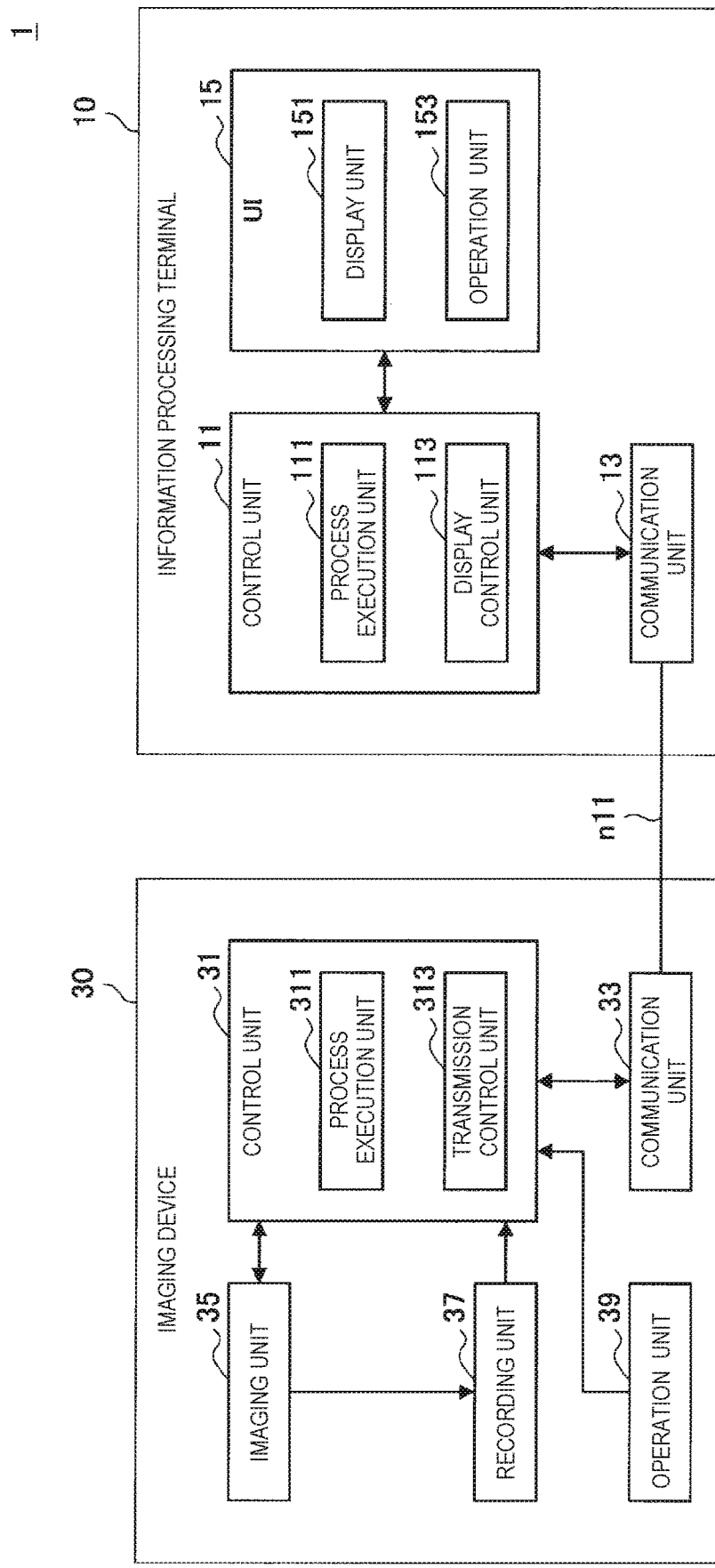
FIG. 3 is a block diagram illustrating an example of a functional configuration of the information processing system according to the first embodiment.

Next, an example of a functional configuration of the information processing system 1 according to the present embodiment will be described with reference to FIG. 3. FIG. 3 is a block diagram illustrating an example of the functional configuration of the information processing system 1 according to the present embodiment. As illustrated in FIG. 3, the information processing terminal 10 includes a control unit 11, a communication unit 13, and a UI 15. In addition, the imaging device 30 includes a control unit 31, a communication unit 33, an imaging unit 35, a storage unit 37, and an operation unit 39.

The communication unit 13 is a communication interface through which each configuration of the information processing terminal 10 communicates with the imaging device 30 via the wireless network n11. As a specific example of the network n11, as described above, a network based on the Wi-Fi (registered trademark) standard can be exemplified.

Moreover, hereinafter, when each configuration of the information processing terminal 10 transmits and receives data to and from the imaging device 30 via the network n11, the data is assumed to be transmitted and received via the communication unit 13 unless otherwise mentioned.

The UI 15 is a user interface with which the user operates the information processing terminal 10. The UI 15 may include a display unit 151 through which the information processing terminal 10 such as a display presents information to the user and an operation unit 153, such as a button or a touch panel, through which the user operates the information processing terminal 10.

The control unit 11 is configured to be able to control an operation of the imaging device 30 connected via the network n11. The control unit 11 includes a process execution unit 111 and a display control unit 113.

The process execution unit 111 controls an operation of the imaging device 30 by executing an application generated based on an API through which the imaging device 30 is operated via the network n11 in response to an instruction from the user via the operation unit 153. Moreover, the process execution unit 111 is equivalent to an example of a "process control unit."

The display control unit 113 causes the display unit 151 to display an operation screen presented by a component (a graphical user interface (GUI)) through which the imaging device 30 is operated via the network n11. In addition, the display control unit 113 acquires an image captured by the imaging device 30 from the imaging device 30 via the network n11 and causes the display unit 151 to display the acquired image. Moreover, in the display control unit 113, a configuration that acquires an image from the imaging device 30 is equivalent to an example of an "acquisition unit."

As a specific example, the control unit 11 may instruct the imaging device 30 to capture an image via the network n11 based on an instruction from the user via the UI 15. In this case, the control unit 11 may acquire captured images from the imaging device 30 via the network n11 as a response to the instruction. In addition, the control unit 11 may present an image acquired from the imaging device 30 to the user via the UI 15.

In particular, the control unit 11 according to the present disclosure may cause the imaging device 30 to capture a plurality of still images as a series of images, as in continuous photography (so-called continuous shoot) or bracket photography. Here, the bracket photography refers to a capturing method of capturing a plurality of still images while changing imaging conditions such as exposure, white balance, and ISO sensitivity. In addition, the control unit 11 according to the present disclosure may cause the imaging device 30 to capture a moving image as a series of images.

Moreover, an operation screen which is presented to the user via the display unit 151 in order for the control unit 11 to cause the imaging device 30 to capture a moving image or a plurality of still images as a series of images will be described later in a second embodiment. In addition, an example of a method in which the control unit 11 presents a series of images captured by the imaging device 30 to the user via the display unit 151 will be described later in a third embodiment.

In addition, the control unit 11 may instruct the imaging device 30 to output a through image via the network n11 based on an instruction from the user via the UI 15. In this case, the control unit 11 sequentially acquires captured through images from the imaging device 30 via the network n11 as a response to the instruction. Then, the control unit 11 may sequentially present the acquired through images to the user via the UI 15.

In addition, the control unit 11 may refer to or update various kinds of information retained in the imaging device 30 via the network n11. As a specific example, the control unit 11 may acquire information indicating various kinds of settings such as imaging conditions retained in the imaging device 30 from the imaging device 30 via the network n11 and may present the acquired information to the user via the UI 15. In addition, the control unit 11 may instruct the imaging device 30 to update the information indicating the various kinds of settings retained in the imaging device 30 via the network n11 based on an instruction from the user via the UI 15.

The communication unit 33 is a communication interface through which each configuration of the imaging device 30 communicates with the information processing terminal 10 via the wireless network n11. As a specific example of the network n11, as described above, a network based on the Wi-Fi (registered trademark) standard can be exemplified.

Moreover, hereinafter, when each configuration of the imaging device 30 transmits and receives data to and from the information processing terminal 10 via the network n11, the data is assumed to be transmitted and received via the communication unit 33 unless otherwise mentioned.

The imaging unit 35 includes an image sensor and captures an image such as a still image or a moving image of a subject based on an instruction from the control unit 31 to be described below. The image sensor is, for example, an imaging element such as complementary metal-oxide semiconductor (CMOS) image sensor or a charge coupled device (CCD) image sensor that images a subject and obtains digital data of the captured image. The imaging unit 35 may record the captured image on the storage unit 37. In addition, the imaging unit 35 may output the captured image directly to the control unit 31.

In addition, the imaging unit 35 may capture an image based on imaging conditions instructed from the control unit 31. As specific examples of the imaging conditions, exposure based on a diaphragm or shutter speed, a magnification ratio such as an optical zoom or a digital zoom, ISO sensitivity, and white balance can be exemplified.

In addition, the imaging unit 35 may capture so-called through images (for example, decimated images) based on an instruction from the control unit 31 and sequentially output the captured through images to the control unit 31.

The storage unit 37 is a recording medium that records captured images. The storage unit 37 can be configured as a recording medium contained in the imaging device 30. In addition, the storage unit 37 may be configured as an external recording medium which can be detachably mounted on the imaging device 30.

Moreover, in the example illustrated in FIG. 3, a configuration example in which the imaging device 30 contains the imaging unit 35 is illustrated, but the imaging unit 35 may be installed outside of the imaging device 30. Similarly, in the example illustrated in FIG. 3, a configuration example in which the imaging device 30 contains the storage unit 37 is illustrated, but the storage unit 37 may be installed outside of the imaging device 30.

The operation unit 39 is configured so that the user can operate the imaging device 30. As a specific example of the operation unit 39, an input device such as a button or a switch can be exemplified.

The control unit 31 is configured to be able to control an operation of the imaging unit 35 based on an instruction from a user via at least one of the operation unit 39 and the information processing terminal 10 connected via the network n11. The control unit 31 includes a process execution unit 311 and a transmission control unit 313.

The process execution unit 311 receives an instruction from the information processing terminal 10 via the network n11 and executes a function corresponding to this instruction to control an operation of the imaging unit 35. In addition, the process execution unit 311 receives an operation of the operation unit 39 by the user and executes a function in associated in advance with the operation unit 39 to control an operation of the imaging unit 35.

Moreover, the process execution unit 311 may switch control content of an operation of the imaging unit 35 according to various operation modes such as continuous photography (so-called continuous shoot), bracket photography, and moving-image photography. In this case, for example, the process execution unit 311 may execute a function according to a preset operation mode to realize control according to the operation mode.

In addition, according to a state of the imaging device 30, the process execution unit 311 may restrict (suppress) execution of a function according to at least some of the operation modes. For example, in continuous photography (continuous shoot), bracket photography, and moving-image photography, a larger storage region is necessary to retain or record a series of captured images than when one still image is captured. Therefore, the process execution unit 311 may restrict (suppress) an operation in a mode in which a moving image or a plurality of still images are captured, for example, in a state in which it is difficult for the imaging device 30 to ensure a storage region equal to or greater than a pre-decided capacity. Moreover, as an example of the state in which it is difficult for the imaging device 30 to ensure a storage region equal to or greater than the pre-decided capacity, a state in which an external recording medium is not mounted on the imaging device 30 or a state in which an empty region of a recording medium (for example, the storage unit 37) is not sufficient can be exemplified.

The transmission control unit 313 acquires an image (a still image, a moving image, or a through image) captured by the imaging unit 35 under the control of the process execution unit 311 and transmits the acquired image to the information processing terminal 10 via the network n11. In addition, in the transmission control unit 313, a configuration that acquires an image from the imaging unit 35 is equivalent to an example of an "acquisition unit."

Moreover, when an operation of the imaging unit 35 is controlled in an operation mode in which a moving image or a plurality of still images are captured as a series of images, the transmission control unit 313 according to the present disclosure first transmits thumbnail images of the series of captured images to the information processing terminal 10. Then, the transmission control unit 313 transmits only at least some of the images instructed from the information processing terminal 10 among the series of images to the information processing terminal 10. In addition, the details of a process related to the transmission of the series of images by the transmission control unit 313 will be described separately in the third embodiment.

The example of the functional configuration of the information processing system 1 according to the embodiment has been described above with reference to FIG. 3.

1.3. Hardware Configuration

Figure 4:
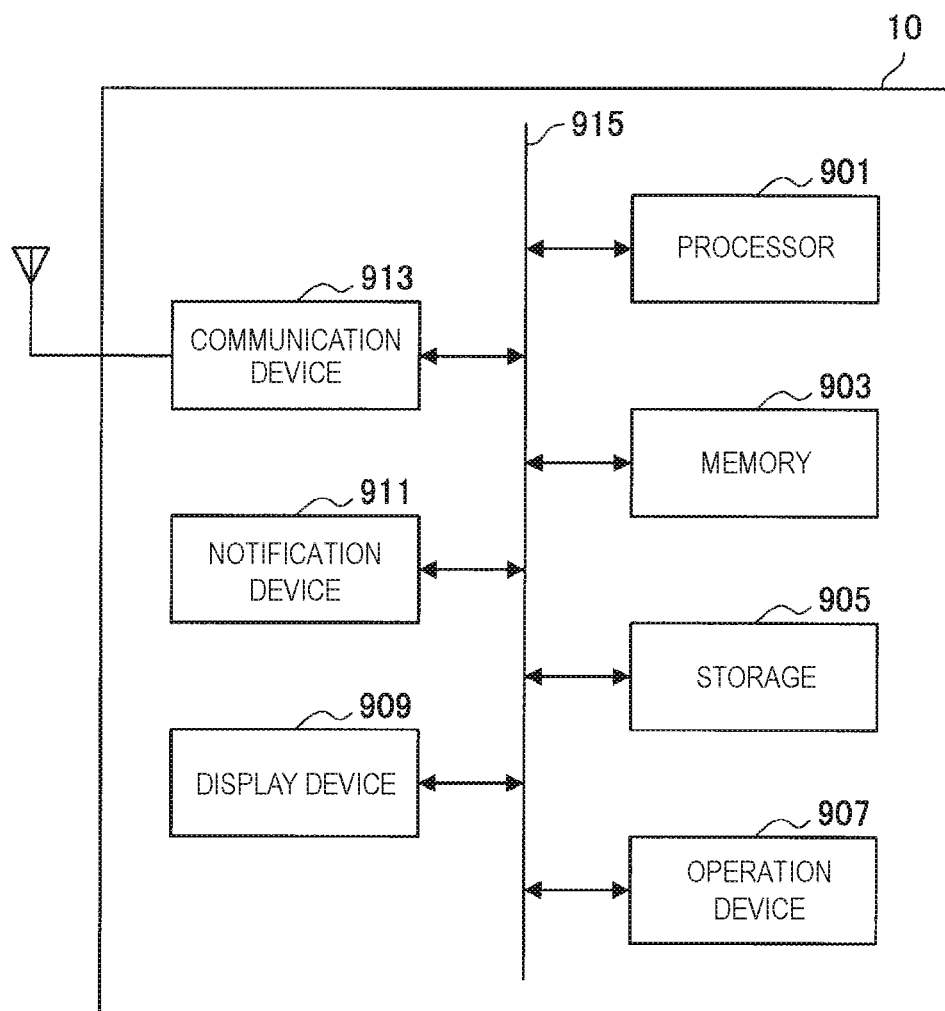
FIG. 4 is a diagram illustrating an example of a hardware configuration of an information processing terminal according to the first embodiment.

Next, an example of a hardware configuration of the information processing terminal 10 according to the present embodiment will be described with reference to FIG. 4. FIG. 4 is a diagram illustrating an example of the hardware configuration of an information processing terminal 10 according to the present embodiment.

As illustrated in FIG. 4, the information processing terminal 10 according to the present embodiment includes a processor 901, a memory 903, a storage 905, an operation device 907, a display device 909, a communication device 913, and a bus 915. In addition, the information processing terminal 10 may include a notification device 911.

The processor 901 is, for example, a central processing unit (CPU), a graphics processing unit (GPU), a digital signal processor (DSP), or a system on chip (SoC) and executes various processes of the information processing terminal 10. The processor 901 can be configured of, for example, an electronic circuit that executes various calculation processes. Moreover, the above-described control unit 11 can be realized by the processor 901.

The memory 903 includes a random access memory (RAM) and a read-only memory (ROM) and stores programs and data which are executed by the processor 901. The storage 905 can include a storage medium such as a semiconductor memory or a hard disk.

The operation device 907 has a function of generating an input signal so that the user can execute a desired operation. The operation device 907 may be configured to include, for example, an input unit such as a touch panel, a button, or a switch through which the user inputs information and an input control circuit which generates an input signal based on an input by the user and supplies the input signal to the processor 901. For example, the above-described operation unit 153 can be configured of the operation device 907.

The display device 909 is an example of an output device and may be, for example, a liquid crystal display (LCD) device or an organic light emitting diode (OLED) display. In this case, the display device 909 can notify the user of predetermined information by displaying a screen. In addition, the above-described display unit 151 can be configured of the display device 909.

The notification device 911 may be a device that notifies the user of predetermined information by a lighting or blinking pattern, as in light emitting diode (LED). In addition, the notification device 911 may be a device that notifies the user of predetermined information by outputting a predetermined acoustic signal, as in a speaker.

The communication device 913 is communication means included in the information processing terminal 10 and communicates with an external device via a network. The communication device 913 is a wired or wireless communication interface. When the communication device 913 is configured as a wireless communication interface, the communication device 913 may include a communication antenna, a radio frequency (RF) circuit, and a baseband processor.

The communication device 913 has a function of executing various kinds of signal processing on a signal received from an external device and can supply a digital signal generated from a received analog signal to the processor 901. Moreover, the above-described communication unit 13 can be configured of the communication device 913.

The bus 915 connects the processor 901, the memory 903, the storage 905, the operation device 907, the display device 909, the notification device 911, and the communication device 913 to each other. The bus 915 may include a plurality of kinds of buses.

In addition, a program that causes hardware such as a processor, a memory, and a storage contained in a computer to execute the same functions as the configuration of the above-described information processing terminal 10 can also be generated. In addition, a computer-readable storage medium recording the program can also be supplied.

1.4. Conclusion

The description has been made with reference to FIGS. 1 to 4 according to the first embodiment mainly focusing on the various configurations of the information system according to the present disclosure. Moreover, the details of operation screens of the information processing system according to the present disclosure and processes related to transmission of images between the information processing terminal 10 and the imaging device 30 will be described below according to the second and third embodiments.

2. SECOND EMBODIMENT

2.1. Overview

Next, an example of an operation screen for capturing images in the information processing system 1 according to the above-described first embodiment will be described according to the second embodiment. In the present embodiment, an example of an operation screen for capturing a plurality of still images as a series of images via a GUI in a so-called digital camera such as the imaging device 30, as in an operation via a touch panel installed as a UI on the information processing terminal 10 or the like, will be described.

Accordingly, a task of the present embodiment will be first summarized to further simplify characteristics of the operation screen according to the present embodiment.

In an imaging device such as a so-called digital camera, the position of a focus of an imaging optical system for imaging a subject is controlled by an autofocus function (hereinafter referred to as an "AF function" in some cases) of pushing a shutter button halfway (a so-called half-push), and then an image is captured by pushing the shutter button fully (a so-called full-push). Moreover, hereinafter, a state in which the shutter button is pushed halfway is referred to as a "half-push state" and a state in which the shutter button is pushed fully is referred to as a "full-push state" in some cases.

Figure 5:
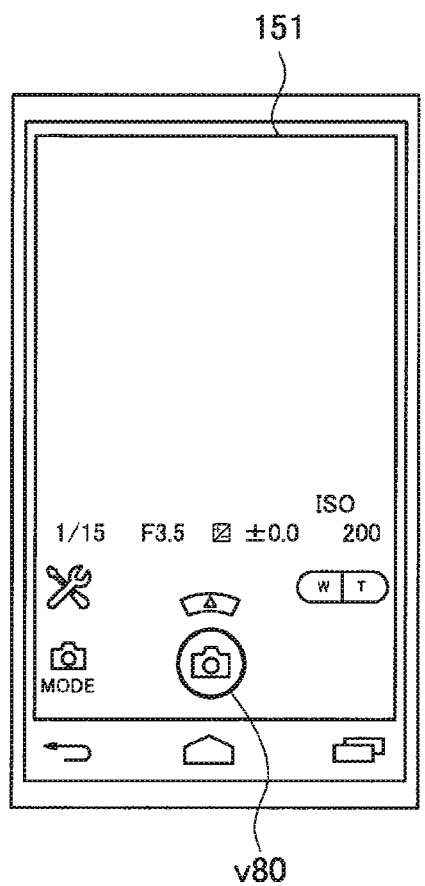
FIG. 5 is an explanatory diagram illustrating an example of an operation screen when one still image is captured while an AF function in an imaging device is operated through an operation via a GUI.

Here, an example of an operation screen for capturing an image in the imaging device 30 while the AF function is operated through an operation via a GUI, as in an operation via a touch panel, will be described exemplifying a case in which one still image is captured. For example, FIG. 5 illustrates an example of an operation screen when one still image is captured while an AF function in the imaging device 30 is operated through an operation via a GUI. In the example illustrated in FIG. 5, the information processing terminal 10 causes the display unit 151 to display an operation screen on which a shutter button v80 is displayed as an interface controlling an operation of the imaging device 30.

Next, an example of an operation method of capturing an image in the imaging device 30 while the AF function is operated based on the operation screen illustrated in FIG. 5 will be described with reference to FIG. 6. FIG. 6 is an explanatory diagram illustrating an example of the operation method when one still image is captured while the AF function in the imaging device 30 is operated through an operation via the GUI.

In the example illustrated in FIG. 6, as illustrated in the left drawing, when the user selects (for example, touches) the shutter button v80 using an operation object u11 such as a finger, the information processing terminal 10 first causes the imaging device 30 to operate the AF function while the selected state is maintained (that is, the selected state is held). At this time, the imaging device 30 decides a focus position v60 in an image v70 acquired via an imaging optical system or an imaging element based on a pre-decided setting of the AF function and controls a focus position of the imaging optical system such that focusing is achieved at the focus position v60.

Then, as illustrated in the right drawing, when the user cancels the selected state of the shutter button v80 (for example, cancels the holding state), the information processing terminal 10 causes the imaging device 30 to capture a still image.

In this way, because it is difficult to realize a half-push and a full-push using a shutter button of a so-called digital camera in an operation via a GUI, for example, a so-called holding operation is associated with a half-push state and cancellation of the holding operation is associated with a full-push state.

On the other hand, when an imaging device such as a so-called digital camera captures a plurality of still images while the AF function is operated (for example, in a continuous shoot mode), the AF function is operated in a half-push state, and image capturing, that is, continuous shoot, starts when the state transitions to the full-push state. Then, the imaging device continues the started continuous shoot as long as the full-push state is maintained and ends the continued continuous shoot with cancellation of the full-push state, that is, a change to a state in which the shutter button is not pushed. That is, in the imaging device, three operations, the "operation of the AF function," the "start of the continuous shoot," and the "end of the continuous shoot," are realized in accordance with three states, the "half-push state," the "maintenance of the full-push state," and the "cancellation of the full-push state."

Meanwhile, in the operation screen and the operation method illustrated in FIGS. 5 and 6, the AF function is operated by executing the holding operation on the shutter button v80 displayed on the display unit 151, as described above, and images are captured by cancelling the holding operation. That is, in the examples illustrated in FIGS. 5 and 6, only two states, the "holding operation" and the "cancellation of the holding operation" on the shutter button v80, can be expressed, and thus it is difficult to realize three operations, the "operation of the AF function," the "start of the continuous shoot", and the "end of the continuous shoot."

Accordingly, in the present embodiment, examples of an operation screen for capturing a plurality of still images as a series of images while the AF function in the imaging device 30 is operated through an operation via a GUI and an operation method based on the operation screen will be proposed. Moreover, examples of an operation screen and an operation method according to the embodiment will be described in detail below.

2.2. Configuration of Operation Screen and Operation Method

Figure 7:
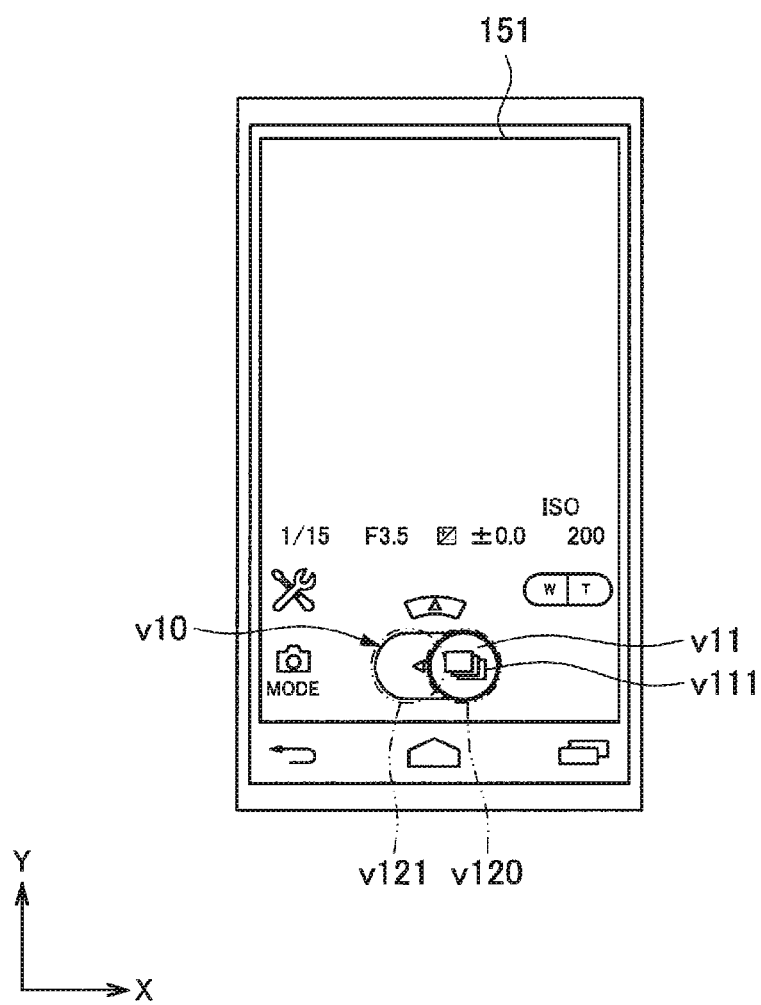
FIG. 7 is an explanatory diagram illustrating an example of the operation screen for capturing a plurality of still images as a series of images while the AF function in the imaging device is operated through an operation via the GUI.

First, an example of an operation screen for capturing a plurality of still images as a series of images in the imaging device 30 while the AF function is operated through an operation via a GUI displayed on the display unit 151 will be described as an operation screen according to the present embodiment with reference to FIG. 7. FIG. 7 is an explanatory diagram illustrating an example of the operation screen for capturing a plurality of still images as a series of images while the AF function in the imaging device 30 is operated through the operation via the GUI. Moreover, in the following description, the short direction of the display unit 151 of the information processing terminal 10 is assumed to be the x axis and the long direction thereof is assumed to be the y axis in the description. That is, in FIG. 7, the horizontal direction of the drawing is equivalent to the x axis and the vertical direction of the drawing is equivalent to the y axis.

In the example illustrated in FIG. 7, in the case of an operation mode in which a plurality of still images are captured as a series of image (for example, a continuous shoot mode), the information processing terminal 10 causes the display unit 151 to display an operation screen on which a slider v10 is displayed as an interface for controlling an operation of the imaging device 30. The slider v10 is configured such that a display object v11 can be moved among a plurality of positions set in predetermined directions on the display unit 151. For example, in the example illustrated in FIG. 7, positions v120 and v121 are set along the x axis and the display object v11 is configured to be movable between the positions v120 and v121 along the x axis.

In addition, as illustrated in FIG. 7, an icon v111 indicating an operation mode (for example, a continuous shoot mode) of the imaging device 30 may be presented in the display object v11.

Figure 8:
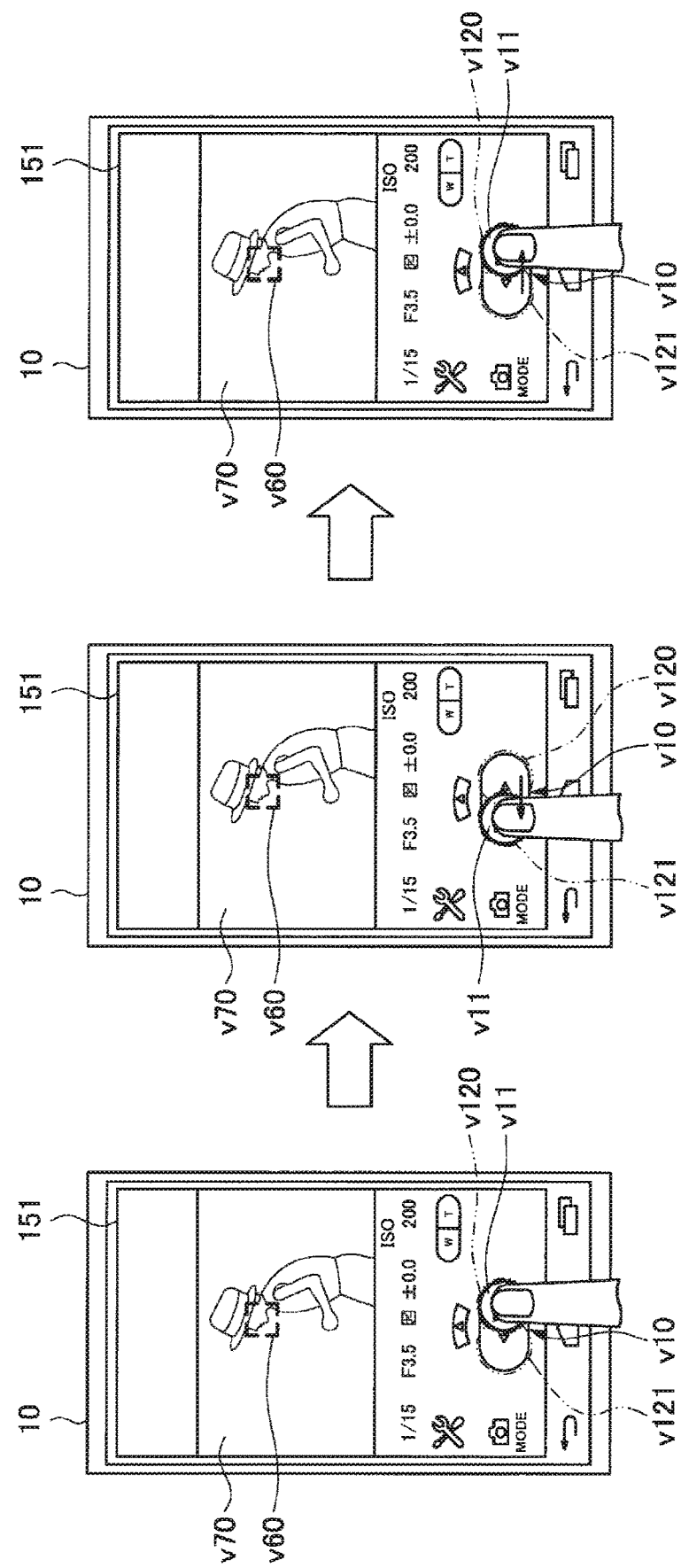
FIG. 8 is an explanatory diagram illustrating an example of an operation method when a plurality of still images are captured as a series of images while the AF function in the imaging device is operated through an operation via the GUI.

Next, an example of an operation method of capturing a plurality of still images as a series of images while the AF function in the imaging device 30 is operated based on the operation screen illustrated in FIG. 7 will be described with reference to FIG. 8. FIG. 8 is an explanatory diagram illustrating an example of the operation method when the plurality of still images are captured as the series of images while the AF function in the imaging device 30 is operated through an operation via the GUI.

In the example illustrated in FIG. 8, first, as illustrated in the left drawing, the information processing terminal 10 does not start controlling an operation related to capturing of images by the imaging device 30 in a state in which the display object v11 is located at the position v120. Moreover, hereinafter, the position v120 is referred to as an "initial position v120" in some cases.

As illustrated in the left drawing, when the user selects (for example, touches) the display object v11 located at the initial position v120 using the operation object u11 such as a finger and the selected state is maintained (that is, held), the information processing terminal 10 causes the imaging device 30 to operate the AF function. At this time, for example, the imaging device 30 decides the focus position v60 in the image v70 acquired via the imaging optical system and the imaging element based on the pre-decided setting of the AF function and controls a focus position of the imaging optical system such that focusing is achieved at the focus position v60. Moreover, a state in which the imaging device 30 executes the focus control based on the AF function in this way is equivalent to an example of a "photography preparation state."

Subsequently, as illustrated in the middle drawing, when the user moves the display object v11 of which the selected state is maintained so that the display object v11 is slid toward the position v121, the information processing terminal 10 instructs the imaging device 30 to start an operation based on a pre-decided operation mode (hereinafter referred to as a "predetermined operation mode" in some cases). In other words, when the information processing terminal 10 detects an operation of moving the display object v11 to the position v121, the information processing terminal 10 starts controlling an operation of the imaging device 30 based on the predetermined operation mode.

For example, in the example illustrated in FIG. 8, an operation mode in which a plurality of still images are captured as a series of images (for example, a continuous shoot mode) is set as the predetermined operation mode. Therefore, the information processing terminal 10 instructs the imaging device 30 to start capturing images in the continuous shoot mode. The imaging device 30 receiving the instruction from the information processing terminal 10 starts capturing the images in the continuous shoot mode and continues an operation related to the capturing of the images until the imaging device 30 is instructed to end the capturing of the images in the continuous shoot mode. Moreover, for example, the operation mode may be configured to be appropriately changed based on an advance operation by the user.

Then, as illustrated in the right drawing, when the user moves the display object v11 located at the position v121 to the initial position v120 again, the information processing terminal 10 instructs the imaging device 30 to end the operation (that is, the operation of giving the instruction to start previously) based on the continued predetermined operation mode. In other words, when the information processing terminal 10 detects the operation of moving the display object v11 to the initial position v120, the information processing terminal 10 ends the control of the operation of the imaging device 30 based on the previously started predetermined operation mode.

Figure 9:
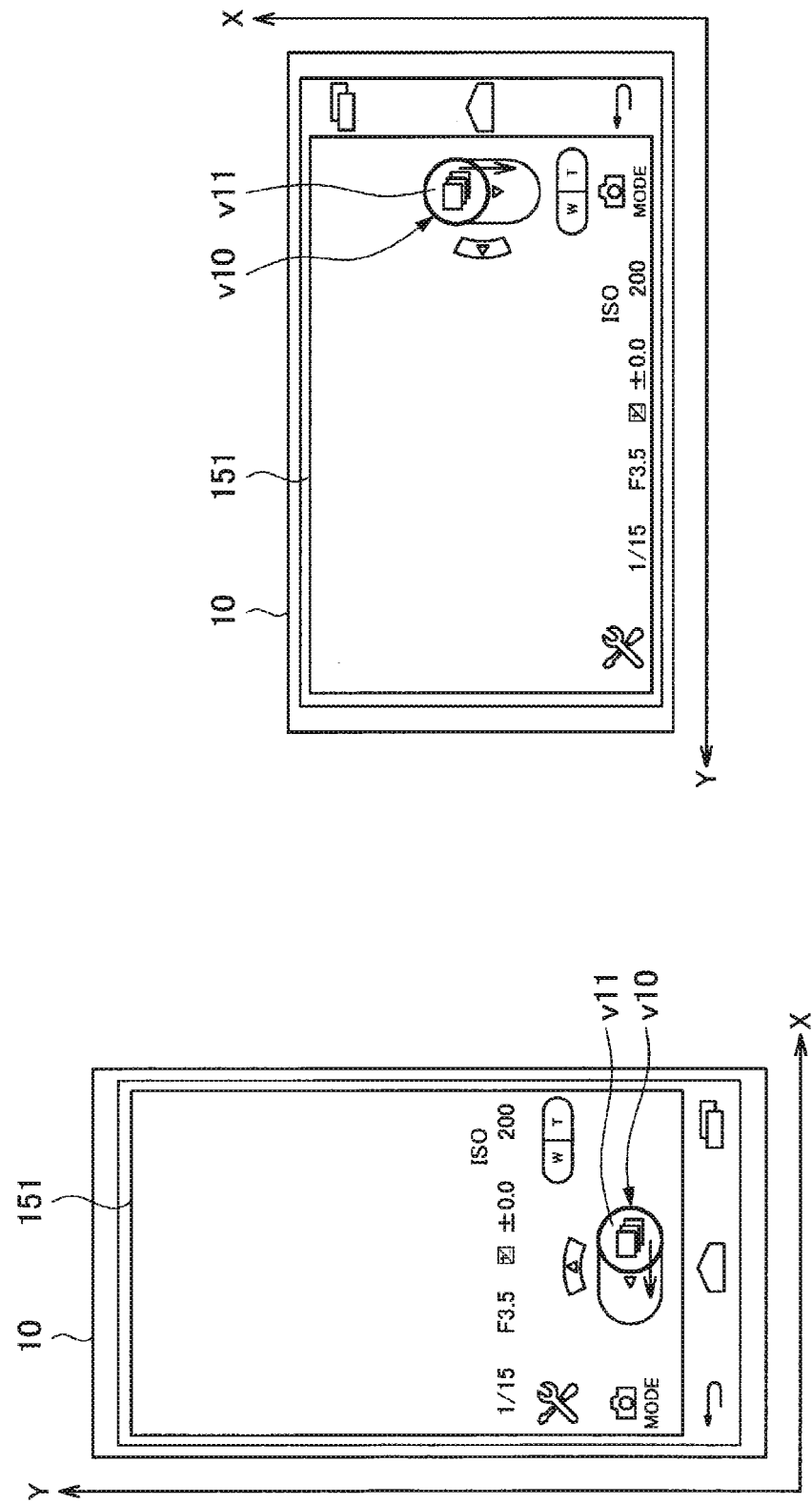
FIG. 9 is an explanatory diagram illustrating an example of a display position of a slider in the operation screen.

Next, an example of a display position of the slider v10 in an operation screen displayed on the display unit 151 will be described in more detail with reference to FIG. 9. FIG. 9 is an explanatory diagram illustrating the example of the display position of the slider v10 in the operation screen and illustrates an example of a display position of the slider v10 when the information processing terminal 10 is maintained in the vertical orientation and when the information processing terminal 10 is maintained in the horizontal orientation. Moreover, in the example illustrated in FIG. 9, the x axis indicates the short direction of the display unit 151 and the y axis indicates the long direction of the display unit 151.

For example, the left drawing of the example illustrated in FIG. 9 illustrates the information processing terminal 10 which is maintained in the vertical orientation. Here, the state in which the information processing terminal 10 is maintained in the vertical orientation refers to a state in which the information processing terminal 10 is maintained so that the long direction (that is, the y axis) of the display unit 151 is the vertical direction when viewed by the user. As illustrated in the left drawing of FIG. 9, when the information processing terminal 10 is maintained in the vertical orientation, for example, the slider v10 is displayed near the lower end of the display unit 151 so that the display object v11 can be moved in the right and left directions.

Similarly, the right drawing of the example illustrated in FIG. 9 illustrates the information processing terminal 10 which is maintained in the horizontal orientation. Here, the state in which the information processing terminal 10 is maintained in the horizontal orientation refers to a state in which the information processing terminal 10 is maintained so that the short direction (that is, the x axis) of the display unit 151 is the vertical direction when viewed by the user. As illustrated in the right drawing of FIG. 9, when the information processing terminal 10 is maintained in the horizontal orientation, for example, the slider v10 is displayed near the right end of the display unit 151 so that the display object v11 can be moved in the upward and downward directions.

In this way, in the example illustrated in FIG. 9, when the information processing terminal 10 is maintained in either the vertical orientation or the horizontal orientation, the slider v10 is displayed near any end portion in the long direction (the y axis) of the display unit 151 so that the display object v11 can be moved in the short direction (the x axis) of the display unit 151. In other words, for example, when the information processing terminal 10 is maintained in either the vertical orientation or the horizontal orientation, the slider v10 is displayed on the display unit 151 at a predetermined relative position with respect to the display unit 151. In such a configuration, when the information processing terminal 10 is maintained in either the vertical orientation or the horizontal orientation, the user can intuitively recognize the display position of the slider v10.

Moreover, the example illustrated in FIG. 9 is merely an example and the display position of the slider v10 is not limited. As a specific example, when the information processing terminal 10 is maintained in either the vertical orientation or the horizontal orientation, the slider v10 may be displayed normally in a given orientation when viewed by the user.

Figure 10:
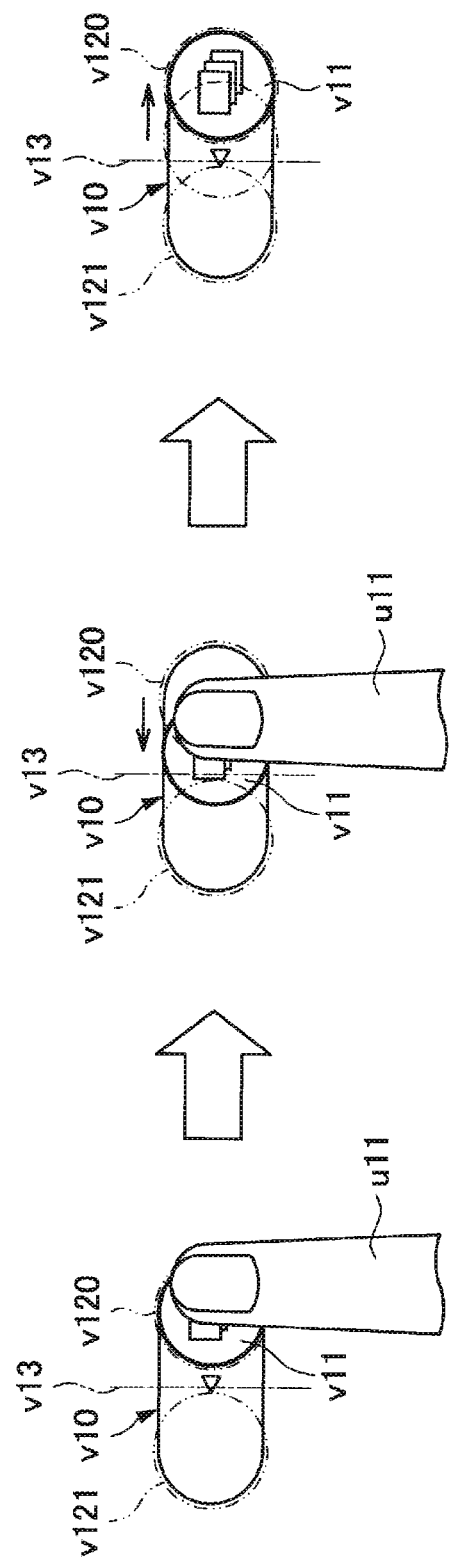
FIG. 10 is an explanatory diagram illustrating an example of display control of the slider based on a user operation and an operation of the information processing terminal accompanied with the display control.
Figure 11:
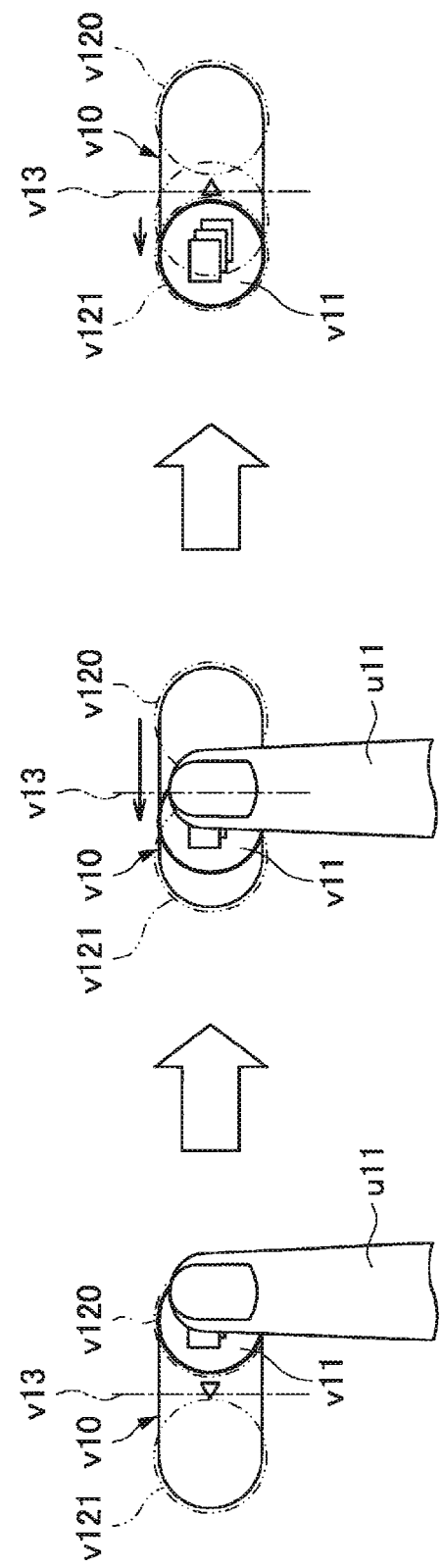
FIG. 11 is an explanatory diagram illustrating an example of the display control of the slider based on the user operation and the operation of the information processing terminal accompanied with the display control.

Next, examples of display control of the slider v10 based on a user operation through the operation object u11 and an operation of the information processing terminal 10 accompanied with the display control of the slider v10 will be described in more detail with reference to FIGS. 10 and 11. FIGS. 10 and 11 are explanatory diagrams illustrating the examples of the display control of the slider v10 based on the user operation and the operation of the information processing terminal 10 accompanied with the display control of the slider v10.

Moreover, both FIGS. 10 and 11 illustrate cases in which the display object v11 is operated using the operation object u11 so that the display object v11 of the slider v10 is moved from the initial position v120 to the position v121. The example illustrated in FIG. 10 shows that a movement amount of the display object v11 from the initial position v120 is less than a pre-decided threshold. In addition, the example illustrated in FIG. 11 shows that a movement amount of the display object v11 from the initial position v11 is equal to or greater than the pre-decided threshold. Moreover, reference numeral v13 in FIGS. 10 and 11 schematically denotes a boundary at which the movement amount of the display object v11 from the initial position v120 is equal to or greater than the threshold.

For example, the left drawing illustrated in FIG. 10 illustrates a state in which the display object v11 is selected when the user touches the display object v11 located at the initial position v120 for the selection using the operation object u11 such as a finger and holds the touched state. In the example illustrated in FIG. 10, as illustrated in the middle drawing, the user moves the touched display object v11 to be slid toward the position v121 within a range in which the movement amount does not exceed the threshold, and subsequently cancels the held state of the display object v11. Moreover, by cancelling the held state of the display object v11, the selected state of the display object v11 is cancelled.

That is, the example illustrated in FIG. 10 shows that the selected state of the display object v11 located at the initial position v120 as illustrated in the left drawing of FIG. 10 is cancelled at the position at which the movement amount from the initial position v120 is less than the threshold as illustrated in the middle drawing (that is, the held state is cancelled).

At this time, the information processing terminal 10 starts controlling an operation of the imaging device 30 based on a predetermined operation mode (for example, the continuous shoot mode) with the movement of the display object v11 toward the position v121 based on the operation executed using the operation object u11, as illustrated in the left drawing and the middle drawing of FIG. 10. In other words, the information processing terminal 10 instructs the imaging device 30 to start an operation (that is, the operation of giving the instruction to start previously) based on the predetermined operation mode with the movement of the display object v11 from the position v120 to the position v121.

Then, as illustrated in the middle drawing of FIG. 10, the information processing terminal 10 continues to control the operation of the imaging device 30 based on the operation mode as long as the display object v11 is continuously moved from the initial position v120 to the position v121 (that is, a state in which the display object v11 is not located at the initial position v120).

As illustrated in the middle drawing of FIG. 10, when the selected state of the display object v11 is cancelled at a position at which the movement amount from the initial position v120 is less than the threshold, the information processing terminal 10 moves the display object v11 to the initial position v120, as illustrated in the right drawing. At this time, the information processing terminal 10 displays the display object v11 of which the selected state is cancelled (that is, the held state by the operation object u11 is cancelled) so that the display object v11 is moved toward the initial position v120 in an animated manner.

Then, the information processing terminal 10 ends the control of the operation of the imaging device 30 based on the continued predetermined operation mode with the movement of the display object v11 of the initial position v120. In other words, the information processing terminal 10 instructs the imaging device 30 to end the operation (that is, the operation of giving the instruction to start previously) based on the continued predetermined operation mode with the movement of the display object v11 to the initial position v120.

In addition, as another example, FIG. 11 illustrates a case in which the user moves the display object v11 to be slid toward the position v121 so that the movement amount is equal to or greater than the threshold. Specifically, the left drawing illustrated in FIG. 11 illustrates a state in which the user selects the display object v11 by touching the display object v11 located at the initial position v120 for the selection using the operation object u11 such as a finger and holds the touched state. In addition, in the example illustrated in FIG. 11, as illustrated in the middle drawing, the user moves the touched display object v11 to be slid toward the position v121 so that the movement amount is equal to or greater than the threshold, and subsequently cancels the held state of the display object v11. Moreover, like the example illustrated in FIG. 10, by cancelling the held state of the display object v11, the selected state of the display object v11 is cancelled.

That is, the example illustrated in FIG. 11 shows that the selected state of the display object v11 located at the initial position v120 as illustrated in the left drawing of FIG. 11 is cancelled at the position at which the movement amount from the initial position v120 is equal to or greater than the threshold as illustrated in the middle drawing (that is, the held state is cancelled).

At this time, the information processing terminal 10 starts controlling an operation of the imaging device 30 based on a predetermined operation mode (for example, the continuous shoot mode) with the movement of the display object v11 toward the position v121 based on the operation executed using the operation object u11, as illustrated in the left drawing and the middle drawing of FIG. 11. Moreover, as illustrated in the middle drawing of FIG. 10, the information processing terminal 10 continues to control the operation of the imaging device 30 based on the operation mode as long as the display object v11 is continuously moved from the initial position v120 to the position v121 (that is, a state in which the display object v11 is not located at the initial position v120). This operation is the same as that of the example illustrated in FIG. 10.

As illustrated in the middle drawing of FIG. 11, when the selected state of the display object v11 is cancelled at a position at which the movement amount from the initial position v120 is equal to or greater than the threshold, the information processing terminal 10 moves the display object v11 to the position v121, as illustrated in the right drawing. At this time, the information processing terminal 10 displays the display object v11 of which the selected state is cancelled (that is, the held state by the operation object u11 is cancelled) so that the display object v11 is moved toward the position v121 in an animated manner.

Moreover, a state in which the display object v11 moved to the position v121 is located at the position v121 is maintained. Then, the information processing terminal 10 continues the control of the operation of the imaging device 30 based on the predetermined operation mode as long as the state in which the display object v11 is located at the position v121 is maintained, that is, a state in which the display object v11 is not located at the initial position v120 is continued.

Of course, when the display object v11 located at the position v121 is moved to the initial position v120 based on an operation executed using the operation object u11, the information processing terminal 10 ends the control of the operation of the imaging device 30 based on the continued predetermined operation mode.

Moreover, the control of the display object v11 described above with reference to FIGS. 10 and 11 is merely an example and is not necessarily limited to the form in which the display is controlled such that the display object v11 is moved, as described above. When the selected state of the display object v11 is cancelled, irrespective of a movement amount of the display object v11, the display object vi may be maintained at a position at which the selected state is cancelled without moving the display object v11. In addition, whether to control the display of the display object v11, as described above with reference to FIGS. 10 and 11, may be switched in accordance with advance settings based on a user operation.

The examples of the operation screens according to the present embodiment and the examples of the operations of capturing the plurality of still images as the series of images while the AF function in the imaging device 30 is operated based on the operation screens have been described above with reference to FIGS. 7 to 11. In the foregoing configurations, the information processing system 1 according to the present embodiment can separately realize three operations, the "operation of the AF function," the "start of continuous shoot," and the "end of the continuous shoot," through operations via the GUI, such as operations via the touch panel.

Moreover, as described above, the information processing system 1 according to the present embodiment can separately realize three different operations through operations via the GUI by presenting the above-described slider v10 as an input interface to the user. Therefore, an application destination of the operation screen according to the present embodiment is not necessarily limited to only the case in which a plurality of still images are captured as a series of images while the AF function in the imaging device 30 is operated.

As a specific example, the above-described slider v10 may be presented to the user as an input interface when bulb photography is executed in the imaging device 30. In this case, three operations, an "operation of the AF function," "start of the bulb photography (shutter opening)," and "end of the bulb photography (end of the shutter opening)," may be allocated to operations on the above-described slider v10.

2.3. Process

Figure 12:
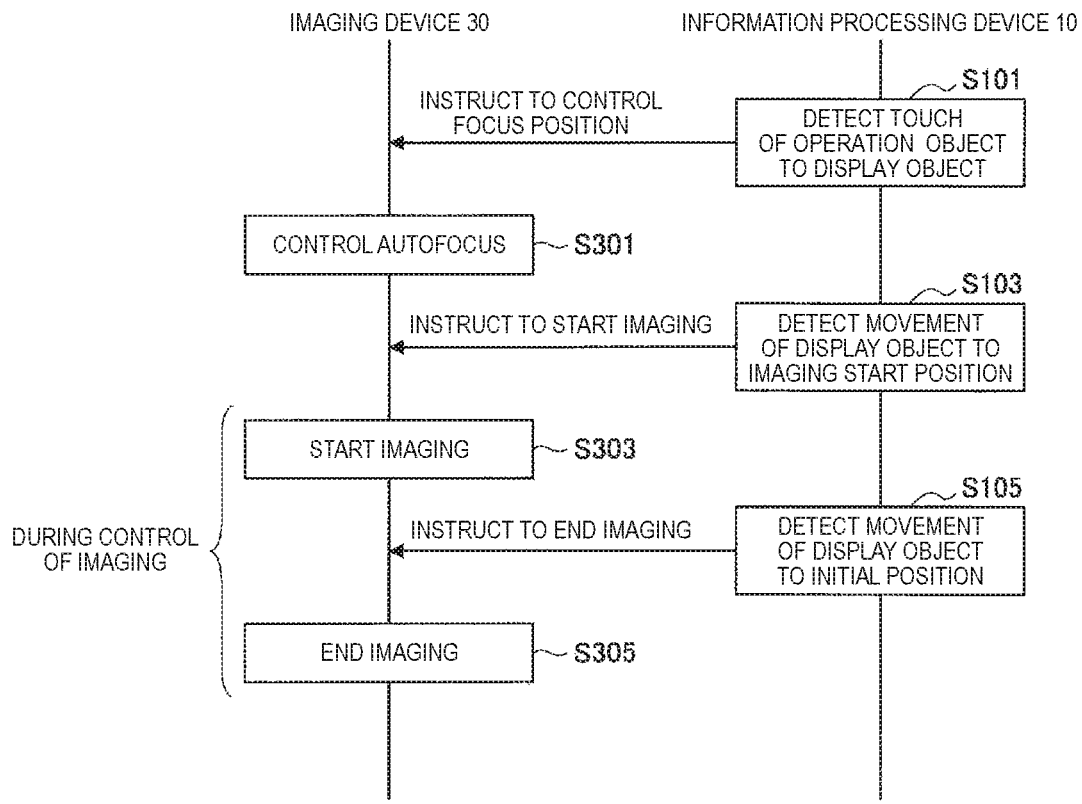
FIG. 12 is an explanatory diagram illustrating an example of the flow of a series of processes of the information processing system according to a second embodiment of the present disclosure.

Next, a case in which a plurality of still images are captured as a series of images while the AF function in the imaging device 30 (that is, the continuous shoot mode) is operated in an example of the flow of a series of processes of the information processing system 1 according to the present embodiment will be described as an example with reference to the above-described FIG. 8 and FIG. 12. FIG. 12 is an explanatory diagram illustrating the example of the flow of a series of processes of the information processing system 1 according to a second embodiment of the present disclosure.

(Step S101)

As illustrated in the left drawing of FIG. 8, it is assumed that the user selects (for example, touches) the display object v11 located at the initial position v120 using the operation object u11 such as a finger and maintains the selected state. At this time, the information processing terminal 10 detects an operation of holding the display object v11 and instructs the imaging device 30 connected via the network n11 to control a focus position accompanied with the AF function with the detection of the holding operation.

(Step S301)

When the information processing terminal 10 connected via the network n11 instructs the imaging device 30 to control a focus position, the imaging device 30 decides the focus position v60 in the image v70 acquired via the imaging optical system and the imaging element based on the pre-decided setting of the AF function. Then, the imaging device 30 controls the focus position of the imaging optical system such that focusing is achieved at the decided focus position v60 by operating the AF function.

(Step S103)

Subsequently, as illustrated in the middle drawing of FIG. 8, it is assumed that the user moves the display object v11 of which the selected state is maintained to be slid toward the position v121. At this time, the information processing terminal 10 detects a slide operation of moving the display object v11 toward the position v121 and moves the display object v11 to the position v121 with the detection of the slide operation. Then, the information processing terminal 10 instructs the imaging device 30 to start an operation based on the predetermined operation mode (for example, the continuous shoot mode) with the movement of the display object v11 from the initial position v120.

(Step S303)

When the information processing terminal 10 instructs the imaging device 30 to start an operation based on the predetermined operation mode, the imaging device 30 starts controlling the operation of the imaging unit 35 based on the operation mode. As a specific example, when the operation mode is an operation mode in which a plurality of still images are captured as the series of images (for example, the continuous shoot mode), the imaging device 30 causes the imaging unit 35 to sequentially capture the still images based on a pre-decided shutter speed. Moreover, the imaging device 30 continues the control of the operation of the imaging unit 35 based on the started predetermined operation mode until the imaging device 30 is instructed to end the operation based on the operation mode.

(Step S105)

Then, as illustrated in the right drawing of FIG. 8, it is assumed that the user moves the display object v11 located at the position v121 to the initial position v120 again. At this time, the information processing terminal 10 detects a slide operation of moving the display object v11 toward the position v121 and moves the display object v11 to the initial position v120 with the detection of the slide operation. Then, the information processing terminal 10 instructs the imaging device 30 to end the operation (for example, the operation of giving the instruction to start previously) based on the continued predetermined operation mode with the movement of the display object v11 to the initial position v120.

(Step S305)

When the information processing terminal 10 instructs the imaging device 30 to end the operation based on the predetermined operation mode, the imaging device 30 ends the control of the operation of the imaging unit 35 based on the continued operation mode. As a specific example, when the operation of the imaging unit 35 is controlled based on the continuous shoot mode, the imaging device 30 instructs the imaging unit 35 sequentially imaging the still images based on the pre-decided shutter speed to end the operation related to the capturing of the still images.

The case in which a plurality of still images are captured as a series of images while the AF function in the imaging device 30 is operated in the example of the flow of the series of processes by the information processing system 1 according to the present embodiment has been described as an example with reference to FIGS. 8 and 12.

2.4. Examples

2.4.1. Example 2-1: Example of Slider

Next, other examples of the slider v10 according to the present embodiment will be described in Example 2-1 with reference to FIGS. 13, 14, and 15A to 15C.

Figure 13:
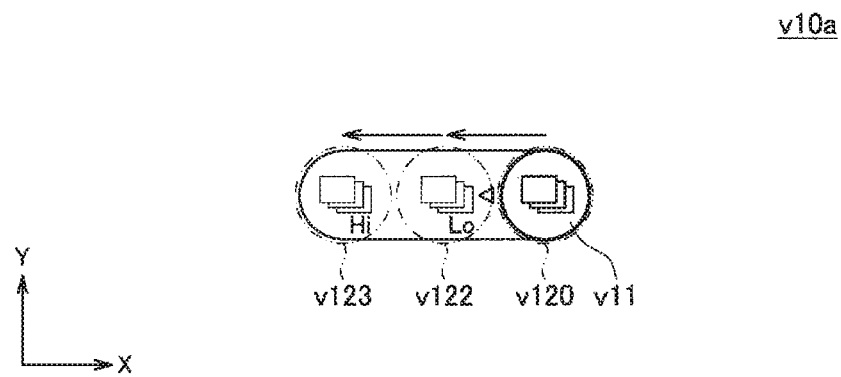
FIG. 13 is a diagram illustrating an example of a slider according to Example 2-1.

For example, FIG. 13 is a diagram illustrating an example of a slider v10 according to the present embodiment. Moreover, when the slider illustrated in FIG. 13 is distinguished from the slider v10 according to the above-described embodiment, the slider is referred to as a "slider v10a" in some cases. In addition, in FIG. 13, the horizontal direction of the drawing is illustrated as the x axis and the vertical direction thereof is illustrated as the y axis.

For the slider v10a illustrated in FIG. 13, an initial position v120, a position v122, and a position v123 are set along the x axis. The display object v11 is configured to be movable among the initial position v120, the position v122, and the position v123 along the x axis. That is, for the slider v10a illustrated in FIG. 13, the plurality of positions (that is, the positions v122 and v123) are set in addition to the initial position v120.

Mutually different operation modes are associated in advance with the other positions (that is, the positions v122 and v123) other than the initial position v120. For example, for the slider v10a illustrated in FIG. 13, a continuous photography mode at a low speed (hereinafter referred to as a "low-speed continuous shoot mode" in some cases) is associated with the position v122. In addition, a continuous photography mode at a high speed (hereinafter referred to as a "high-speed continuous shoot mode" in some cases) is associated with the position v123.

In this case, according to a position which is a movement destination of the display object v11 based on a user operation via the operation object u11, the information processing terminal 10 controls an operation of the imaging device 30 based on an operation mode associated with this position.

Specifically, when the display object v11 located at the initial position v120 is selected using the operation object u11 and the selected state is maintained, the information processing terminal 10 causes the imaging device 30 to operate the AF function.

Then, when the display object v11 of which the selected state is maintained is moved to the position v122 through a user operation via the operation object u11, the information processing terminal 10 starts controlling an operation of the imaging device 30 based on the low-speed continuous shoot mode associated with the position v122. Then, the information processing terminal 10 continues the control of the operation of the imaging device 30 based on the low-speed continuous shoot mode as long as the display object v11 is located at the position v122.

Similarly, when the display object v11 of which the selected state is maintained is moved to the position v123 through a user operation via the operation object u11, the information processing terminal 10 starts controlling an operation of the imaging device 30 based on the high-speed continuous shoot mode associated with the position v123. Then, the information processing terminal 10 continues the control of the operation of the imaging device 30 based on the high-speed continuous shoot mode as long as the display object v11 is located at the position v123.

Moreover, when the display object v11 located at the position v122 or v123 is moved to the initial position v120, the information processing terminal 10 ends the continued (previously started) control of the operation of the imaging device 30, as in the case of the application of the slider v10 according to the above-described embodiment.

In such a configuration, the user can operate the imaging device 30 based on a desired operation mode among the plurality of pre-decided operation modes through an operation via a GUI, as in an operation via the touch panel of the information processing terminal 10.

Moreover, in the example illustrated in FIG. 13, each position is set so that both of the positions v122 and v123 are located on the same side of the initial position v120 (for example, to the left of the initial position v120). However, the example illustrated in FIG. 13 is merely an example. A relative positional relation between the initial position v120 and the plurality of positions other than the initial position v120 is not necessarily limited to the positional relation between the initial positions 120 and the positions v122 and v123 illustrated in FIG. 13.

Figure 14:
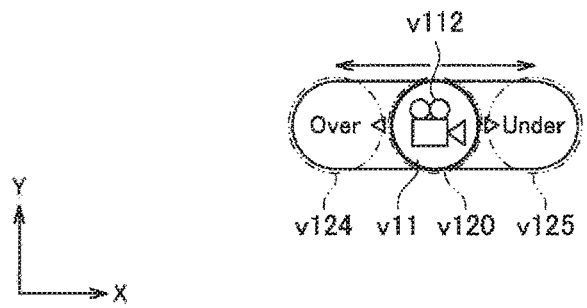
FIG. 14 is a diagram illustrating an example of the slider according to Example 2-1.

For example, the FIG. 14 is a diagram illustrating another example of the slider v10 according to the present embodiment. Moreover, when the slider illustrated in FIG. 14 is distinguished from the slider v10 according to the above-described embodiment, the slider is referred to as a "slider v10b" in some cases. In addition, the slider v10b illustrated in FIG. 14 is illustrated as an example of an interface when an operation related to capturing of a moving image by the imaging device 30 is controlled. Moreover, in FIG. 14, the horizontal direction of the drawing is illustrated as the x axis and the vertical direction thereof is illustrated as the y axis, as in FIG. 13.

For the slider v10b illustrated in FIG. 14, the initial position v120 and positions v124 and v125 are set such that the positions v124 and v125 other than the initial position v120 are located on mutually opposite sides along the x axis using the initial position v120 as a reference. Then, the display object v11 is configured to be movable between the initial position v120 and the positions v124 and v125 along the x axis.

A mode of so-called fast-forward photography (overcrank) in which a moving image is captured with the number of frames larger than the number of frames at the time of reproduction of a moving image is associated with the position v124. In addition, a mode of so-called slow-forward photography (undercrank) in which a moving image is captured with the number of frames smaller than the number of frames at the time of reproduction of a moving image is associated with the position v125. In addition, an icon v112 indicating that a moving image is captured may be presented in the display object v11.

That is, in the example illustrated in FIG. 14, the information processing terminal 10 controls an operation of the imaging device 30 such that a moving image is captured with a preset default number of frames (for example, the same number of frames at the time of reproduction) when the display object v11 is located at the initial position v120.

In addition, when the display object v11 is moved to the position v124 through a user operation via the operation object u11, the information processing terminal 10 starts controlling an operation of the imaging device 30 based on the mode of the fast-forward photography associated with the position v124. Then, the information processing terminal 10 continues the control of the operation of the imaging device 30 based on the mode of the fast-forward photography as long as the display object v11 is located at the position v124.

Similarly, when the display object v11 is moved to the position v125 through a user operation via the operation object u11, the information processing terminal 10 starts controlling an operation of the imaging device 30 based on the mode of the slow-forward photography associated with the position v125. Then, the information processing terminal 10 continues the control of the operation of the imaging device 30 based on the mode of the slow-forward photography as long as the display object v11 is located at the position v125.

Moreover, when the display object v11 located at the position v124 or v125 is moved to the initial position v120, the information processing terminal 10 ends the continued (previously started) control of the operation of the imaging device 30, as in the case of the application of the slider v10 according to the above-described embodiment. That is, in the example illustrated in FIG. 14, the information processing terminal 10 controls the operation of the imaging device 30 such that a moving image is captured with the preset default number of frames with the movement of the display object v11 to the initial position v120.

As described above with reference to FIGS. 13 and 14, the relative positional relations between the initial position v120 and the plurality of positions other than the initial position v120 are not necessarily limited, but may be appropriately modified according to an assumed use form.

Figure 15A:
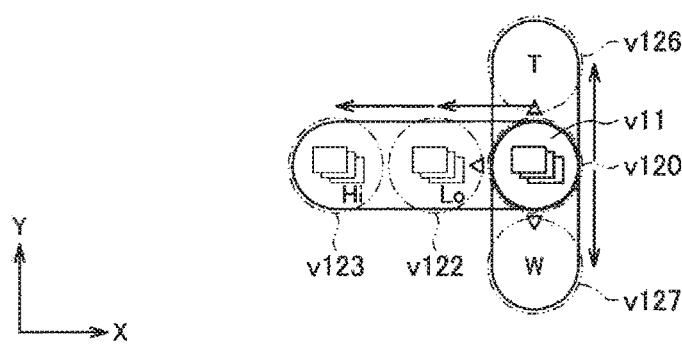
FIG. 15A is a diagram illustrating an example of the slider according to Example 2-1.

Next, still another example of the slider v10 according to the present embodiment will be described with reference to FIG. 15A. FIG. 15A is a diagram illustrating still another example of the slider v10 according to the present embodiment. Moreover, when the slider illustrated in FIG. 15A is distinguished from the slider v10 according to the above-described embodiment, the slider is referred to as a "slider v10c" in some cases. In addition, the slider v10c illustrated in FIG. 15A is illustrated as an example of an interface when an operation related to capturing of a plurality of still images (for example, continuous shoot) by the imaging device 30 is controlled. Moreover, in FIG. 15A, the horizontal direction of the drawing is illustrated as the x axis and the vertical direction thereof is illustrated as the y axis, as in FIGS. 13 and 14.

In the examples illustrated in FIGS. 7, 13, and 14 described above, each position of the slider v10 is set along one predetermined axis (in other words, in one predetermined direction) and the display object v11 is configured to be movable along the one axis.

Meanwhile, for the slider v10c illustrated in FIG. 15A, each position of the slider v10c is disposed along a plurality of axes and the display object v11 is configured to be movable along the plurality of axes.

Specifically, in the example illustrated in FIG. 15A, the initial position v120 is set as a starting point and the positions v122 and v123 are disposed along the x axis. In addition, the initial position v120 is set as the starting point and positions v126 and v127 are disposed along the y axis. The display object v11 is configured to be movable between the initial position v120, the position v122, and the position v123 along the x axis. In addition, the display object v11 is configured to be movable between the initial position v120, the position v126, and the position v127 along the y axis.

Moreover, the same operation mode as in the slider v10a illustrated in FIG. 13 is associated with each of the positions v122 and v123. That is, a low-speed continuous shoot mode is associated with the position v122 and a high-speed continuous shoot mode is associated with the position v123. Since an operation of the information processing terminal 10 when the display object v11 is moved to each of the positions v122 and v123 is the same as in the case of the slider v10a illustrated in FIG. 13, the detailed description thereof will be omitted.

In addition, for the slider v10c illustrated in FIG. 15A, each of the positions v126 and v127 set along the y axis using the initial position v120 as a reference is associated with an operation mode related to control of a magnification ratio (zoom). That is, an operation mode in which a magnification ratio is shifted to a tele-side (telescopic side) is associated with the position v126. In addition, an operation mode in which a magnification ratio is shifted to a wide side (wide angle side) is associated with the position v127.

That is, when the display object v11 is moved to the position v126 through a user operation via the operation object u11, the information processing terminal 10 causes the imaging device 30 to control a position (that is, a zoom position) of the imaging optical system such that the magnification ratio is shifted to the tele-side. Moreover, the information processing terminal 10 continues the control of the operation related to the change in the magnification ratio of the imaging device 30 within a range in which the position of the imaging optical system is movable as long as the display object v11 is located at the position v126 (that is, the imaging optical system reaches a tele-end).

In addition, when the display object v11 is moved to the position v127 through a user operation via the operation object u11, the information processing terminal 10 causes the imaging device 30 to control a position (that is, a zoom position) of the imaging optical system such that the magnification ratio is shifted to the wide side. Moreover, the information processing terminal 10 continues the control of the operation related to the change in the magnification ratio of the imaging device 30 within a range in which the position of the imaging optical system is movable as long as the display object v11 is located at the position v127 (that is, the imaging optical system reaches a wide end).

Moreover, when the display object v11 located at the position v126 or v127 is moved to the initial position v120, the information processing terminal 10 ends the continued (previously started) control of the operation of the imaging device 30 as in the case of the application of the slider v10 according to the above-described embodiment.

As described, above in the slider v10c, the initial position v120 and a position other than the initial position v120 may be disposed along a plurality of axes and the display object v11 may be configured to be movable along the plurality of axes. Moreover, in the example illustrated in FIG. 15A, the display object v11 is configured to be movable along two axes, the x and y axes, but it is needless to say that the number of axes or the relative positional relations between the axes are not limited to the example illustrated in FIG. 15A. That is, the display object v11 may be configured to be movable along a plurality of axes equal to or greater than three axes or the number of axes or positional relations between the axes may be appropriately changed according to an assumed use form.

Figure 15B:
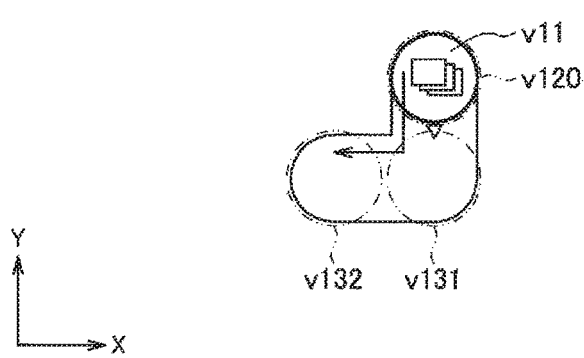
FIG. 15B is a diagram illustrating an example of the slider according to Example 2-1.

Next, still another example of the slider v10 according to the present embodiment will be described with reference to FIG. 15B. FIG. 15B is a diagram illustrating still another example of the slider v10 according to the present embodiment. Moreover, when the slider illustrated in FIG. 15B is distinguished from the slider v10 according to the above-described embodiment, the slider is referred to as a "slider v10d" in some cases. In addition, the slider v10d illustrated in FIG. 15B is illustrated as an example of an interface when an operation related to capturing of a plurality of still images (for example, continuous shoot) by the imaging device 30 is controlled. Moreover, in FIG. 15B, the horizontal direction of the drawing is illustrated as the x axis and the vertical direction thereof is illustrated as the y axis, as in FIGS. 13, 14, and 15A.

For the slider v10d illustrated in FIG. 15B, the initial position v120 and another position v132 different from the initial position v120 are set along a curved path with a hook shape. In addition, the display object v11 is configured to be movable between the initial position v120 and the position v132 along the curved path with the hook shape.

In the example illustrated in FIG. 15B, when the display object v11 located at the initial position v120 is selected using the operation object u11 and the selected state is maintained, the information processing terminal 10 causes the imaging device 30 to operate the AF function.

Then, when the display object v11 of which the selected state is maintained is moved from the initial position v120 through a user operation via the operation object u11, the information processing terminal 10 starts controlling an operation of the imaging device 30 based on the operation mode (for example, the continuous shoot mode) decided in advance.

Moreover, the user cancels the selected state of the display object v11 by moving the display object v11 only in the downward direction within a range which does not exceed a position denoted by reference numeral v131 and cancelling the held state of the display object v11. In this case, the information processing terminal 10 displays the display object v11 of which the selected state is cancelled (that is, the held state by the operation object u11 is cancelled) so that the display object v11 is moved toward the initial position v120 in an animated manner.

Then, the information processing terminal 10 ends the control of the operation of the imaging device 30 based on the continued predetermined operation mode with the movement of the display object v11 to the initial position v120. In other words, the information processing terminal 10 instructs the imaging device 30 to end the operation (that is, the operation of giving the instruction to start previously) based on the continued predetermined operation mode (for example, the continuous shoot mode) with the movement of the display object v11 to the initial position v120.

In addition, it is assumed that the user cancels the selected state of the display object v11 by moving the display object v11 toward the position v131 in a downward direction, further moving the display object v11 toward the position v132 in the left direction, and cancelling the held state of the display object v11. In this case, the information processing terminal 10 displays the display object v11 of which the selected state is cancelled (that is, the held state by the operation object u11 is cancelled) so that the display object v11 is moved toward the position v132 in an animated manner.

Moreover, a state in which the display object v11 moved to the position v132 is located at the position v132 is maintained. Then, the information processing terminal 10 continues the control of the operation of the imaging device 30 based on the predetermined operation mode (for example, the continuous shoot mode) as long as the state in which the display object v11 is located at the position v132 is maintained, that is, a state in which the display object v11 is not located at the initial position v120 is continued.

Of course, when the display object v11 located at the position v132 is moved to the initial position v120 based on an operation executed using the operation object u11, the information processing terminal 10 ends the control of the operation of the imaging device 30 based on the continued predetermined operation mode.

As described above with reference to FIG. 15B, the initial position v120 and a position other than the initial position v120 may not necessarily be set along the predetermined axis (for example, the x axis or the y axis) as long as the initial position v120 and the other position are set along the predetermined route. Moreover, in this case, the display object v11 is configured to be movable between the initial position v120 and a position other than the initial position v120 along the route.

Figure 15C:
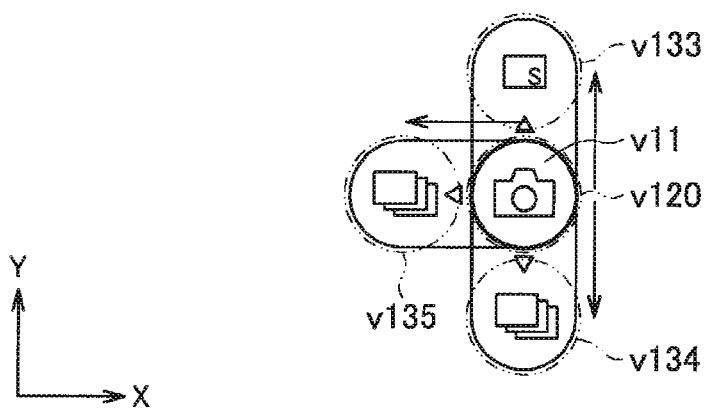
FIG. 15C is a diagram illustrating an example of the slider according to Example 2-1.

Next, still another example of the slider v10 according to the present embodiment will be described with reference to FIG. 15C. FIG. 15C is a diagram illustrating still another example of the slider v10 according to the present embodiment. Moreover, when the slider illustrated in FIG. 15C is distinguished from the slider v10 according to the above-described embodiment, the slider is referred to as a "slider v10e" in some cases. In addition, the slider v10e illustrated in FIG. 15B is illustrated as an example of an interface when an operation related to capturing of a plurality of still images (for example, continuous shoot) by the imaging device 30 is controlled. Moreover, in FIG. 15C, the horizontal direction of the drawing is illustrated as the x axis and the vertical direction thereof is illustrated as the y axis, as in FIGS. 13, 14, 15A, and 15B.

For the slider v10e illustrated in FIG. 15C, each position of the slider v10e is disposed along a plurality of axes and the display object v11 is configured to be movable along the plurality of axes, as in the slider v10c illustrated in FIG. 15A.

Specifically, in the example illustrated in FIG. 15C, the initial position v120 is set as a starting point and a position v135 is disposed along the x axis. In addition, the initial position v120 is set as the starting point and positions v133 and v134 are disposed along the y axis. The display object v11 is configured to be movable between the initial position v120 and the position v135 along the x axis. In addition, the display object v11 is configured to be movable between the initial position v120, the position v133, and the position v134 along the y axis.

A so-called single shoot mode in which one still image is captured is associated with the position v133. In addition, the continuous shoot mode is associated with the positions v134 and v135.

In the example illustrated in FIG. 15C, when the display object v11 located at the initial position v120 is selected using the operation object u11 and the selected state is maintained, the information processing terminal 10 causes the imaging device 30 to operate the AF function.

Then, when the display object v11 of which the selected state is maintained is moved to the position v133 through a user operation via the operation object u11, the information processing terminal 10 causes the imaging device 30 to capture one still image based on the single shoot mode associated with the position v133. Moreover, when the user cancels the held state of the display object v11 moved to the position v133 (that is, the user cancels the selected state), the information processing terminal 10 may display the display object v11 of which the selected state is cancelled so that the display object v11 is moved toward the initial position v120 in an animated manner.

In addition, when the display object v11 of which the selected state is maintained is moved to the position v134 through a user operation via the operation object u11, the information processing terminal 10 starts controlling an operation of the imaging device 30 based on the continuous shoot mode associated with the position v134. Then, the information processing terminal 10 continues the control of the operation of the imaging device 30 based on the continuous shoot mode as long as the display object v11 is located at the position v134.

Moreover, even when the user cancels the held state of the display object v11 moved to the position v134 (that is, the user cancels the selected state), the information processing terminal 10 maintains the state in which the display object v11 of which the selected state is cancelled is located at the position v134.

Of course, when the display object v11 located at the position v134 is moved to the initial position v120 based on an operation executed using the operation object u11, the information processing terminal 10 ends the control of the operation of the imaging device 30 based on the continued continuous shoot mode.

Similarly, when the display object v11 of which the selected state is maintained is moved to the position v135 through a user operation via the operation object u11, the information processing terminal 10 starts controlling an operation of the imaging device 30 based on the continuous shoot mode associated with the position v135. Then, the information processing terminal 10 continues the control of the operation of the imaging device 30 based on the continuous shoot mode as long as the display object v11 is located at the position v135.

On the other hand, when the user cancels the held state of the display object v11 moved to the position v135 (that is, the user cancels the selected state), the information processing terminal 10 displays the display object v11 of which the selected state is cancelled so that the display object v11 is moved toward the initial position v120 in an animated manner.

Then, the information processing terminal 10 ends the control of the operation of the imaging device 30 based on the continued predetermined continuous shoot mode with the movement of the display object v11 to the initial position v120. In other words, the information processing terminal 10 instructs the imaging device 30 to end the operation (that is, the operation of giving the instruction to start previously) based on the continued predetermined continuous shoot mode with the movement of the display object v11 to the initial position v120.

As described above with reference to FIG. 15C, the same operation mode may be associated with different positions. In addition, in this case, the information processing terminal 10 may supply a different operation form to the user according to each position as in the case in which the display object v11 is moved to each of the positions v134 and v135 in FIG. 15C.

The examples of the slider v10 according to the present embodiment have been described in Example 2-1 with reference to FIGS. 13, 14, and 15A to 15C.

2.4.2. Example 2-2: Cooperation with Operation Unit of Imaging Device

Next, an example of display control of the slider v10 by the information processing terminal 10 when the operation unit 39 of the imaging device 30 is operated will be described in Example 2-2.

As described above, in the information processing system 1 according to the present embodiment, the imaging device 30 may include the operation unit 39 as an interface for operating the imaging device 30. That is, in the information processing system 1 according to the present embodiment, the user can operate the imaging device 30 through any of an operation via the information processing terminal 10 and an operation via the operation unit 39.

That is, for example, the user can execute an operation such that the imaging device 30 is caused to start continuous photography (that is, continuous shoot) through an operation via the information processing terminal 10 and the imaging device 30 is caused to end the continuous photography through an operation via the operation unit 39. Therefore, in view of such a situation, the information processing terminal 10 may switch a display state of the slider v10 according to an operation state when the operation state of the imaging device 30 is switched through an operation via the operation unit 39 of the imaging device 30.

Figure 16:
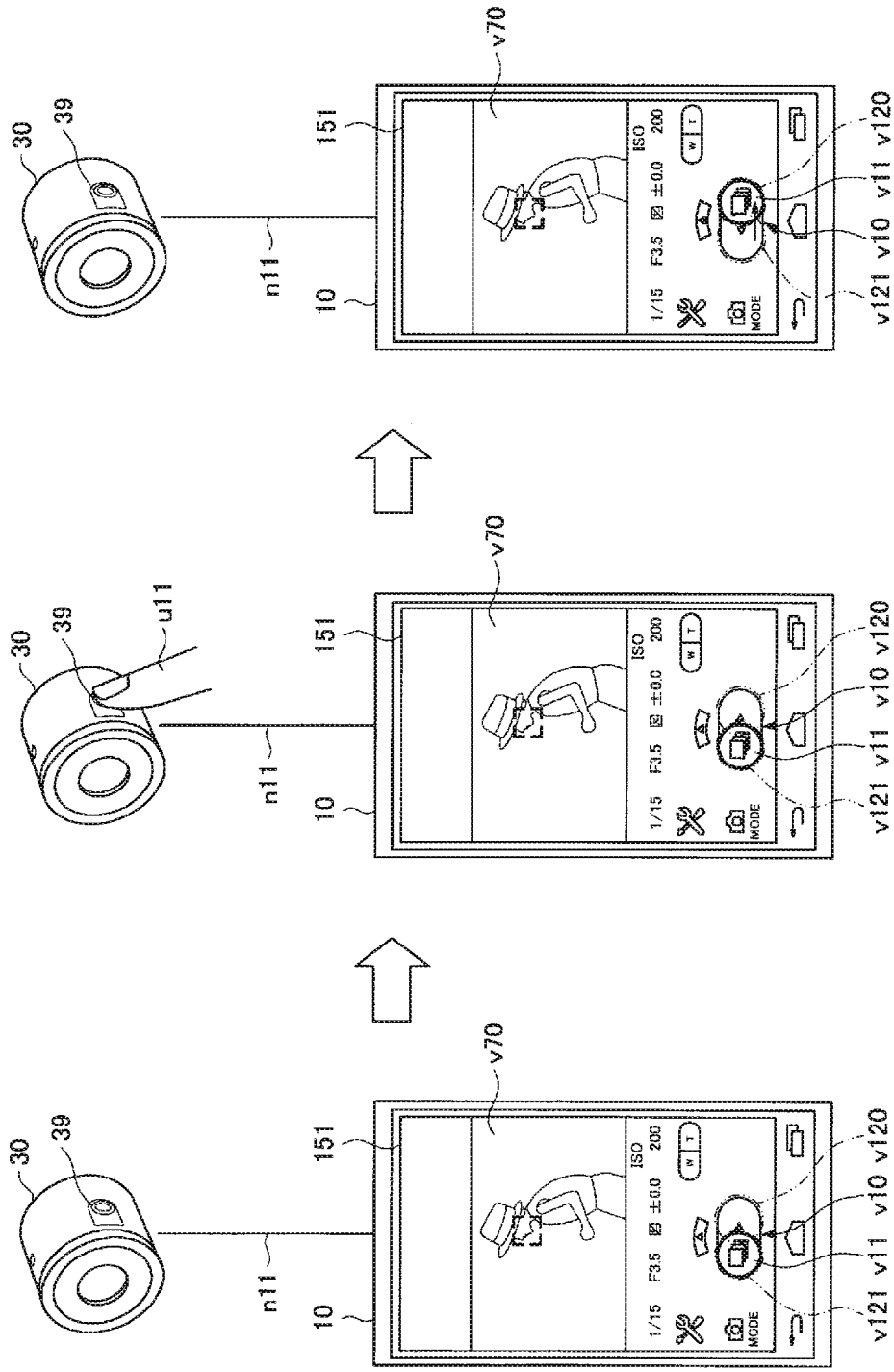
FIG. 16 is an explanatory diagram illustrating an example of an operation of an information processing terminal according to Example 2-2.
Figure 17:
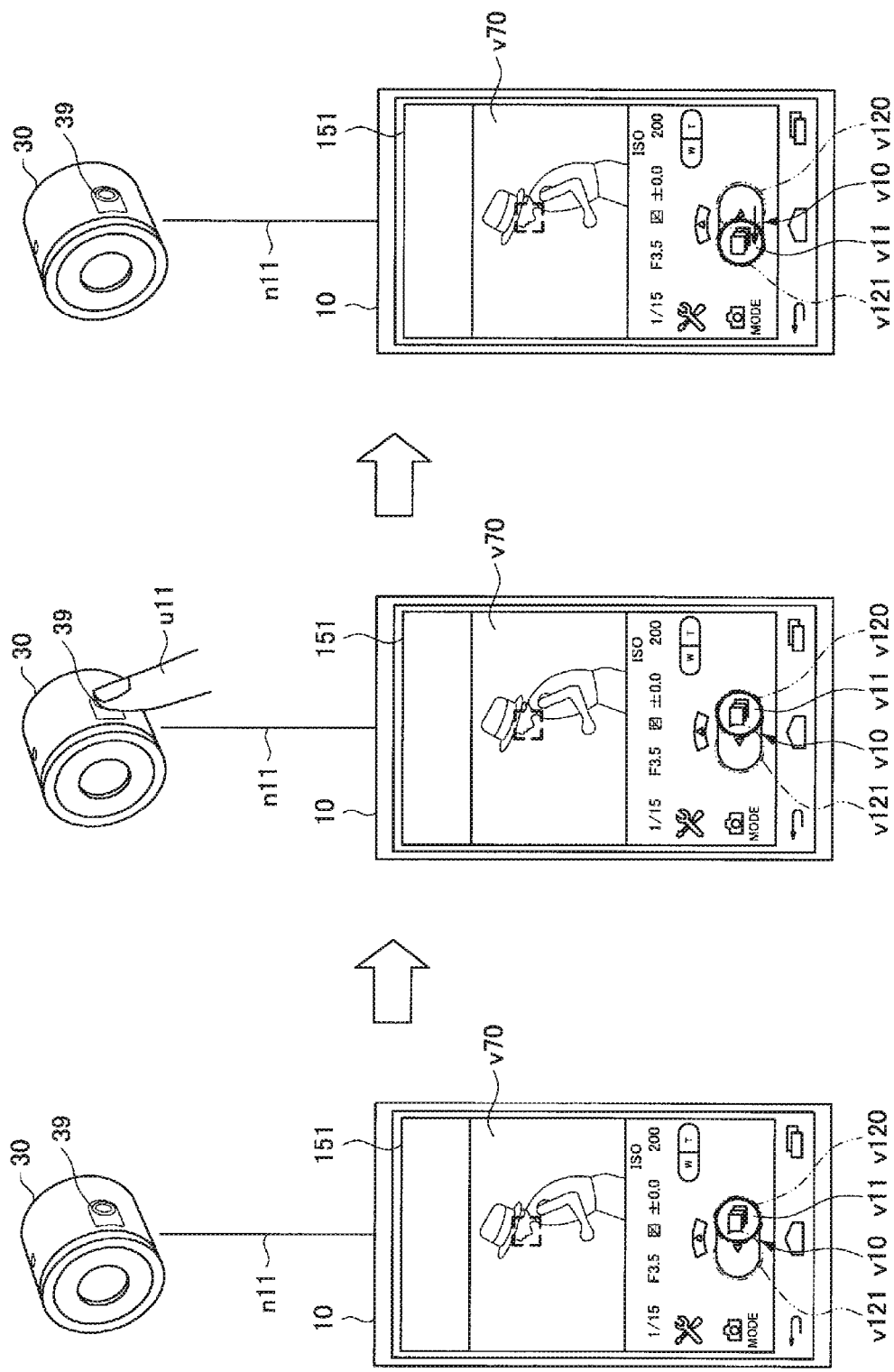
FIG. 17 is an explanatory diagram illustrating an example of an operation of the information processing terminal according to Example 2-2.

Accordingly, an example of display control of the slider v10 by the information processing terminal 10 when the operation unit 39 of the imaging device 30 is operated will be described below with reference to FIGS. 16 and 17. FIGS. 16 and 17 are explanatory diagrams illustrating examples of an operation of an information processing terminal 10 according to Example 2-2 and illustrate examples of the display control of the slider v10 by the information processing terminal 10 when the operation unit 39 of the imaging device 30 is operated.

First, an example of display control of the slider v10 by the information processing terminal 10 when the operation unit 39 is operated during an operation in the continuous shoot (that is, during continued continuous photography) by the imaging device 30 will be described with reference to FIG. 16. Moreover, the operation unit 39 is assumed to be an interface (for example, a shutter button) for controlling an operation related to capturing of images by the imaging device 30 in this description.

For example, the left drawing of FIG. 16 illustrates a state in which an operation of moving the display object v11 of the slider v10 displayed on the display unit 151 to the position v121 is executed and the information processing terminal 10 starts controlling an operation of the imaging device 30 based on the continuous shoot mode. That is, the left drawing of FIG. 16 illustrates a state in which the imaging device 30 operates based on the continuous shoot mode according to an instruction from the information processing terminal 10 (that is, a state in which the imaging unit 35 is caused to sequentially capture still images at a pre-decided shutter speed).

In this way, it is assumed that when the operation unit 39 is operated by the user in a state in which the imaging device 30 operates based on the continuous shoot mode, the imaging device 30 is instructed to end the operation based on the continuous shoot mode (that is, to end the operation of capturing the plurality of still images), as illustrated in the middle drawing of FIG. 16. At this time, the imaging device 30 is operated via the operation unit 39, ends the operation based on the continued continuous shoot mode, and notifies the information processing terminal 10 that the operation based on the continuous shoot mode is ended via the network n11.

When the imaging device 30 notifies the information processing terminal 10 that the operation based on the continuous shoot mode is ended, the information processing terminal 10 controls display of the slider v10 such that the display object v11 located at the position v121 is moved to the initial position v120, as illustrated in the right drawing of FIG. 16. In such a configuration, when the imaging device 30 ends the operation based on the continuous shoot mode according to an operation via the operation unit 39, the information processing terminal 10 updates the display of the slider v10 in tandem with the end of the operation. Thus, the user can also instruct the imaging device 30 to start an operation (that is, to start the continuous photography) based on the continuous shoot mode again by operating the slider v10.

Next, an example of display control of the slider v10 by the information processing terminal 10 when the imaging device 30 starts an operation based on the continuous shoot mode through an operation via the operation unit 39 will be described with reference to FIG. 17.

For example, the left drawing of FIG. 17 illustrates a state in which the information processing terminal 10 does not start the control of the operation of the imaging device 30 based on the continuous shoot mode, that is, a state in which the operation related to capturing of a plurality of still images by the imaging device 30 (that is, the operation based on the continuous shoot mode) is not started. Moreover, at this time, the display object v11 of the slider v10 displayed on the display unit 151 of the information processing terminal 10 is located at the initial position v120.

In this way, it is assumed that when the operation unit 39 is operated by the user in a state in which the imaging device 30 does not start the operation related to capturing the still images, as illustrated in the middle drawing of FIG. 17, the imaging device 30 is instructed to start the operation based on the continuous shoot mode. At this time, the imaging device 30 is operated via the operation unit 39, starts the operation based on the continued continuous shoot mode, and notifies the information processing terminal 10 that the operation based on the continuous shoot mode via the network n11 is started.

When the imaging device 30 notifies the information processing terminal 10 that the operation based on the continuous shoot mode is started, the information processing terminal 10 controls display of the slider v10 such that the display object v11 located at the initial position v120 is moved to the position v121. In such a configuration, when the imaging device 30 starts the operation based on the continuous shoot mode according to an operation via the operation unit 39, the information processing terminal 10 updates the display of the slider v10 in tandem with the start of the operation. Thus, the user can also instruct the imaging device 30 to end the started operation (that is, to end the continuous photography) based on the continuous shoot mode again by operating the slider v10.

The example of the display control of the slider v10 by the information processing terminal 10 when the operation unit 39 of the imaging device 30 is operated has been described in Example 2-2. Moreover, the foregoing display control is merely an example, and a configuration and a method for realizing the control or an opportunity for the control (for example, a triggered process or operation) are not particularly limited as long as the information processing terminal 10 can control display of the slider v10 according to the operation state of the imaging device 30.

For example, the information processing terminal 10 may sequentially monitor operation states of the imaging device 30 and control display of the slider v10 according to a monitoring result.

As a specific example, the information processing terminal 10 may restrict (suppress) display of the slider v10 in a state in which it is difficult for the imaging device 30 to operate in a mode in which a moving image or a plurality of still images are captured as a series of images. As an example of the state in which it is difficult for the imaging device 30 to operate in the mode in which a moving image or a plurality of still images are captured as a series of images, a state in which an external recording medium is not mounted on the imaging device 30 or a state in which an empty region of a recording medium (for example, the storage unit 37) is not sufficient can be exemplified. In such a configuration, when it is difficult for the imaging device 30 to operate in the mode in which a moving image or a plurality of still images are captured as a series of images, the information processing terminal 10 can impose a restriction that the user may not give an instruction of an operation in the operation mode.

2.5. Conclusion

As described above, the information processing terminal 10 according to the present embodiment presents an operation screen on which the slider v10 (for example, see FIGS. 7 and 8) is displayed as an interface for operating the imaging device 30 to the user via the display unit 151. At this time, the slider v10 is configured such that the display object v11 is movable in a predetermined direction between the initial position v120 and a position v121 other than the initial position v120 set in the predetermined direction.

In such a configuration, the information processing terminal 10 can separately recognize three states, states in which the display object v11 is located at the initial position v120 and the other position v121 and a state in which the selected state of the display object v11 is maintained (that is, a held state).

Therefore, for example, the information processing terminal 10 can also allocate the state in which the display object v11 is located at the initial position v120 and the other position v121 to start of control of an operation of the imaging device 30 based on the predetermined operation and end of the control. In addition, at this time, the information processing terminal 10 can also allocate the state in which the selected state of the display object v11 is maintained to control by which the imaging device 30 is caused to operate the AF function.

That is, in the information processing system 1 according to the present embodiment, it is possible to realize the operations, the "operation of the AF function," the "start of the continuous shoot," and the "end of the continuous shoot," through an operation via a GUI, for example, when the imaging device 30 is caused to capture a plurality of still images as a series of images.

Of course, an application destination of the operation screen on which the slider v10 according to the present embodiment is displayed is not limited to only the case in which a plurality of still images are captured as a series of images (that is, the case of continuous shoot). As a specific example, an operation screen on which the slider v10 is displayed as an input interface when the imaging device 30 is caused to execute bulb photography may be presented to the user. In this case, three operations, an "operation of the AF function," "start of the bulb photography (shutter opening)," and "end of the bulb photography (end of the shutter opening)," may be allocated to operations on the above-described slider v10.

In addition, in the foregoing example, the case in which the imaging device 30 is operated through an operation via the touch panel has been described as an example, but the present disclosure is not necessarily limited to operations via the touch panel as long as the slider v10 is operated using the operation object u11. As a specific example, the slider v10 may be configured to be operated using a point as the operation object u11 by operating the pointer using an operation device such as a mouse.

In addition, an application destination of the operation screen on which the slider v10 according to the present embodiment is displayed is not limited to the configuration (see FIG. 1) of the information processing system 1 described above as long as an operation of the imaging device is controlled through an operation via a GUI as in an operation via the touch panel. As a specific example, it is needless to say that it is possible to obtain the operational advantageous effects described above by also applying the operation screen on which the slider v10 is displayed to a so-called digital camera including a touch panel.

3. THIRD EMBODIMENT

3.1. Overview

Next, an example of a process when images captured by the imaging device 30 are transmitted to the information processing terminal 10 will be described according to a third embodiment.

When a plurality of still images are captured as a series of images, the capacity of data of the plurality of still images captured as the series of images (hereinafter referred to as the "amount of data" in some cases) increases according to the number of captured still images. On the other hand, as in the information processing system 1 (see FIG. 1) according to the present disclosure, in a configuration in which images are transmitted between the imaging device 30 and the information processing terminal 10 via the network n11, there is a possibility of an increase in the amount of data of transmission target images (that is, an increase in the number of images) leading to an increase in traffic of the network n11.

For this reason, when a plurality of still images are captured by the information processing system 1, congestion of the network n11 occurs due to transmission of the series of images captured by the imaging device 30, and transmission and reception of information between the imaging device 30 and the information processing terminal 10 are compressed in some cases.

In particular, not only images captured by the imaging device 30 but also through images to be displayed in the information processing terminal 10 or control information for controlling an operation of the imaging device 30 from the information processing terminal 10 are transmitted and received between the information processing terminal 10 and the imaging device 30 via the network n11. For this reason, there is a request for a configuration capable of efficiently transmitting captured images between the information processing terminal 10 and the imaging device 30 connected via the network n11.

Accordingly, the information processing system 1 according to the present embodiment provides a structure for efficiently transmitting captured images to the information processing terminal 10 (that is, a structure for reducing traffic of the network n11) via the network n11 when the imaging device 30 is caused to capture a series of images (for example, a plurality of still images).

Figure 18:
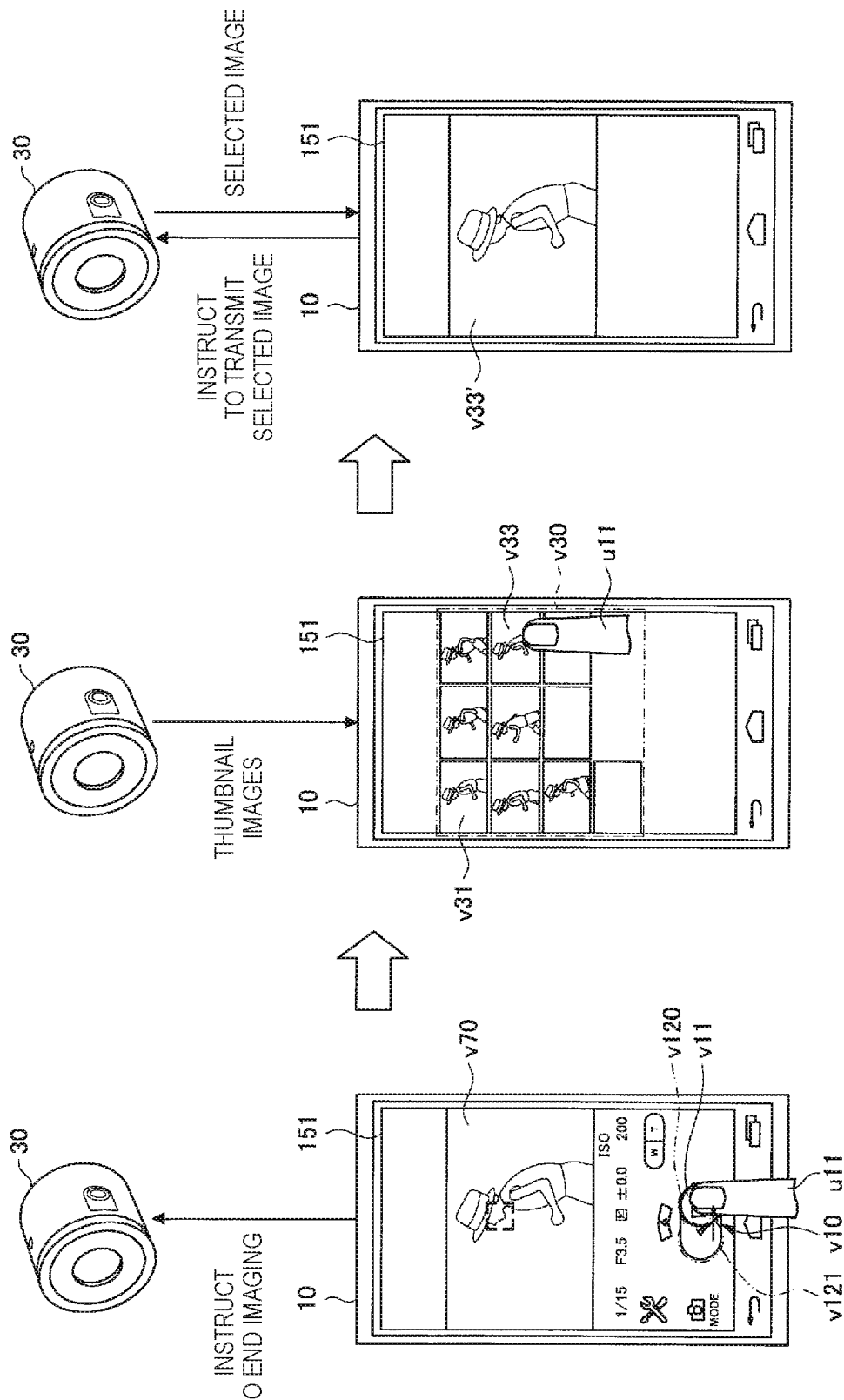
FIG. 18 is an explanatory diagram illustrating an overview of an information processing system 1 according to a third embodiment of the present disclosure.

For example, FIG. 18 is an explanatory diagram illustrating an overview of the information processing system 1 according to the present embodiment of the present disclosure and illustrates an example of the flow of an operation when a plurality of still images captured as a series of images by the imaging device 30 are transmitted to the information processing terminal 10.

The left drawing of FIG. 18 illustrates a state in which the user instructs the imaging device 30 continuously capturing images based on a mode in which a plurality of still images are captured as a series of images (for example, the continuous shoot mode) to end the capturing of the images via the information processing terminal 10.

Specifically, when the user moves the display object v11 located at the position v121 to the initial position v120, the information processing terminal 10 instructs the imaging device 30 to end the operation (for example, an operation based on the continuous shoot mode) based on the continued predetermined operation mode. The imaging device 30 receiving this instruction ends the process related to the continued capturing of the images and retains or records the series of captured images (that is, the plurality of still images) on, for example, a recording medium such as the storage unit 37.

When the imaging device 30 ends capturing of the series of images based on the instruction from the information processing terminal 10, the imaging device 30 generates thumbnail images of the series of captured images.

Moreover, in this description, the thumbnail images indicate images that are reduced so that the plurality of images can be viewed in one list and particularly indicate images that processed so that the amount of data of the captured images is further reduced. Of course, a method of generating the thumbnail images is not particularly limited as long as the amount of data is reduced. As a specific example, the imaging device 30 may generate the thumbnail images by reducing the sizes (dimensions) of the images or may generate the thumbnail images by reducing the resolutions of the images.

Then, as illustrated in the middle drawing of FIG. 18, the imaging device 30 transmits a series of thumbnail images generated from the captured images to the information processing terminal 10 via the network n11.

When the information processing terminal 10 acquires the series of thumbnail images from the imaging device 30, the information processing terminal 10 causes the display unit 151 to display the acquired thumbnail images so that each of the thumbnail images can be selected. For example, in the example illustrated in the middle drawing of FIG. 18, the information processing terminal 10 causes the display unit 151 to display a list v30 in which acquired thumbnail images v31 are presented to each be selectable.

Then, the information processing terminal 10 receives selection of at least some of the thumbnail images among the series of thumbnail images v31 presented via the display unit 151 from the user. For example, in the example illustrated in the middle drawing of FIG. 18, the information processing terminal 10 recognizes the thumbnail images touched by the user using the operation object u11 such as a finger among the thumbnail images v31 presented in the list v30 as the thumbnail image selected by the user. Moreover, hereinafter, the thumbnail image selected by the user is referred to as a "thumbnail image v33" in some cases.

When at least some of the thumbnail images v33 are selected among the series of thumbnail images v31 presented via the display unit 151, the information processing terminal 10 instructs the imaging device 30 to transmit images v33' corresponding to the selected thumbnail images v33, as illustrated in the right drawing of FIG. 18. The imaging device 30 receiving this instruction extracts the images v33' corresponding to the thumbnail images v33 selected by the user from the series of captured images (that is, the images which are generation sources of the series of thumbnail images) and transmits the extracted images v33' to the information processing terminal 10.

Moreover, it is needless to say that the imaging device 30 generates reduced images (for example, screen nails) of the captured images and transmits the reduced images as the images v33' to the information processing terminal 10 when the imaging device 30 transmits the images v33' corresponding to the thumbnail images v33 to the information processing terminal 10.

In the foregoing configuration, in the information processing system 1 according to the present embodiment, the series of images captured by the imaging device 30 can be transmitted from the imaging device 30 to the information processing terminal 10 with only the images selected by the user not being reduced. Therefore, in the information processing system 1 according to the present embodiment, traffic between the imaging device 30 and the information processing terminal 10 is reduced more than when all of the series of images captured by the imaging device 30 is transmitted to the information processing terminal 10 without being reduced. That is, in the information processing system 1 according to the present embodiment, the captured images can be efficiently transmitted between the imaging device 30 and the information processing terminal 10.

3.2. Process

Figure 19:
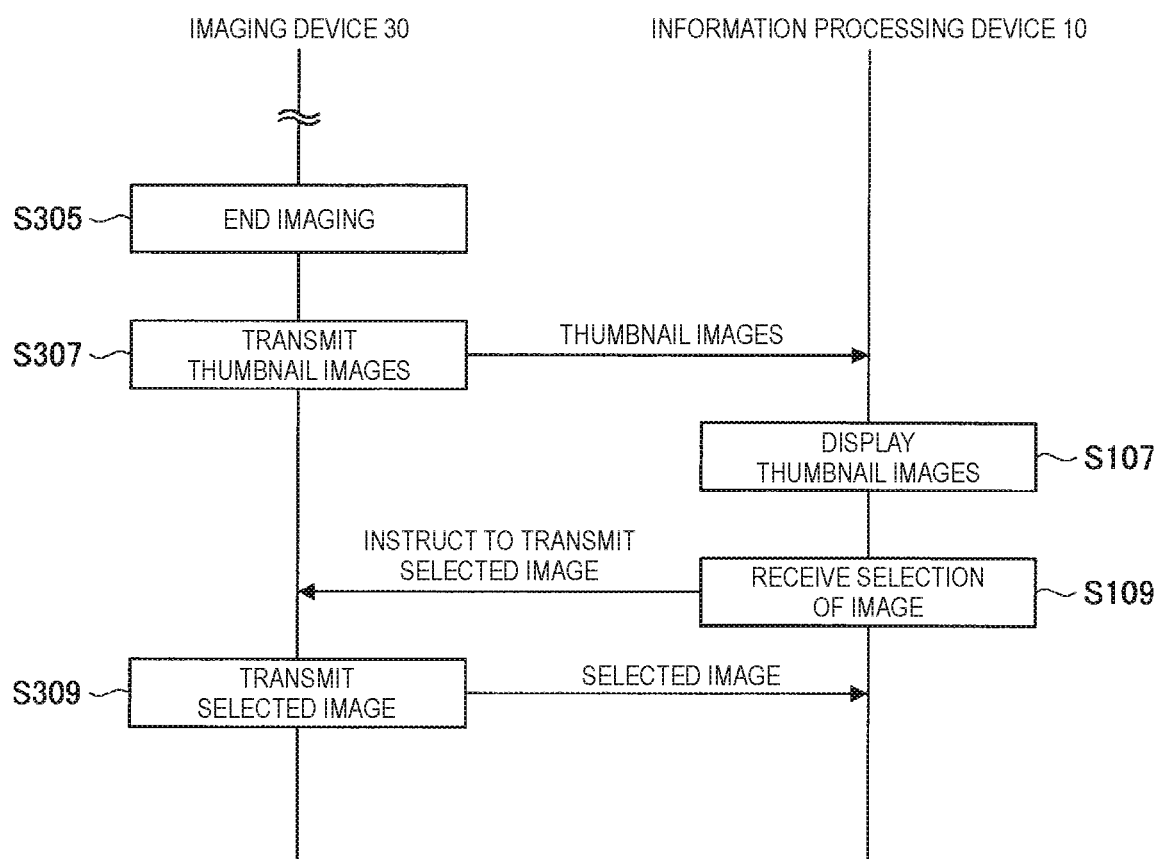
FIG. 19 is an explanatory diagram illustrating an example of the flow of a series of processes of the information processing system according to the third embodiment.

Next, the example of the flow of the series of processes of the information processing system 1 according to the present embodiment will be described focusing on the process of transmitting the images captured by the imaging device 30 to the information processing terminal 10 with reference to FIG. 19. FIG. 19 is an explanatory diagram illustrating an example of the flow of a series of processes of the information processing system 1 according to the third embodiment.

(Step S305)

When the information processing terminal 10 instructs the imaging device 30 to end the operation based on the continued predetermined operation mode (for example, the operation based on the continuous shoot mode), the imaging device 30 ends the process related to the continued capturing of the images and retains or records the series of captured images (that is, the plurality of still images) on, for example, a recording medium such as the storage unit 37.

(Step S307)

Then, when the imaging device 30 ends capturing of the series of images based on the instruction from the information processing terminal 10, the imaging device 30 generates the thumbnail images of the series of captured images and transmits the series of generated thumbnail images to the information processing terminal 10 via the network n11.

(Step S107)

When the information processing terminal 10 acquires the series of thumbnail images from the imaging device 30, the information processing terminal 10 causes the display unit 151 to display the acquired thumbnail images so that the thumbnail images can each be selected.

(Step S109)

The information processing terminal 10 receives selection of at least some of the thumbnail images among the series of thumbnail images v31 presented via the display unit 151 from the user.

Then, when the information processing terminal 10 receives the selection of at least some of the thumbnail images v33 among the series of thumbnail images v31 presented via the display unit 151, the information processing terminal 10 instructs the imaging device 30 to transmit the images v33' corresponding to the selected thumbnail images v33.

(Step S309)

The imaging device 30 receiving this instruction extracts the images v33' corresponding to the thumbnail images v33 selected by the user among the series of captured images (that is, the images which are generation sources of the series of thumbnail images) and transmits the extracted images v33' to the information processing terminal 10.

As described above, in the information processing system 1 according to the present embodiment, the imaging device 30 first generates the thumbnail images of the series of images when the imaging device 30 captures the plurality of still images as the series of images based on the predetermined operation mode such as the continuous shoot mode. Then, the imaging device 30 transmits the generated thumbnail images to the information processing terminal 10. Thus, the user can select desired images among the series of images captured by the imaging device 30 based on the thumbnail images presented to the display unit 151 of the information processing terminal 10.

Then, the imaging device 30 transmits only the images selected by the user via the information processing terminal 10 among the series of captured images to the information processing terminal 10.

In such a configuration, in the information processing system 1 according to the present embodiment, the series of images captured by the imaging device 30 can be transmitted from the imaging device 30 to the information processing terminal 10 with only the images selected by the user not being reduced.

Moreover, the imaging device 30 may interrupt or stop the transmission of the thumbnail images when the imaging device 30 receives a new instruction related to the capturing of the images from the information processing terminal 10 during the transmission of the series of generated thumbnail images (step S307 of FIG. 19). Moreover, when the imaging device 30 interrupts the transmission of the thumbnail images, the imaging device 30 may resume the interrupted transmission of the thumbnail images (that is, the transmission of the thumbnail images generated from the previously captured images) after completion of the capturing of the images based on the new instruction from the information processing terminal 10.

Similarly, when the imaging device 30 receives a new instruction related to the capturing of the images from the information processing terminal 10 during the transmission of the images v33' selected by the user (step S309 of FIG. 19) among the series of captured images via the information processing terminal 10, the imaging device 30 may interrupt or stop the transmission of the images v33'. Moreover, when the imaging device 30 interrupts the transmission of the images v33', the imaging device 30 may resume the interrupted transmission of the images v33' after completion of the capturing of the images based on the new instruction from the information processing terminal 10.

In addition, when the information processing terminal 10 newly acquires the thumbnail images from the imaging device 30 during the presentation of the thumbnail images acquired from the imaging device 30, the information processing terminal 10 may interrupt or stop the presentation of the previously acquired thumbnail images and may present the newly acquired thumbnail images to the user. Moreover, when the information processing terminal 10 interrupts the presentation of the previously acquired thumbnail images, the information processing terminal 10 may present the previously acquired thumbnail images to the user again after completion of the presentation of the newly acquired thumbnail images (for example, completion of selection of the images).

The example of the flow of the series of processes of the information processing system 1 according to the present embodiment has been described focusing on the process of transmitting the images captured by the imaging device 30 to the information processing terminal 10 with reference to FIG. 19.

3.3. Example 3

Next, an example of a case in which a moving image captured by the imaging device 30 is transmitted to the information processing terminal 10 will be described according to Example 3.

When a moving image is captured as a series of images, the amount of data of the moving image captured as the series of images increases according to an imaging time of the moving image. For this reason, when a moving image is captured by the information processing system 1, congestion of the network n11 occurs due to transmission of the series of images (that is, the moving image) captured by the imaging device 30 and transmission and reception of information between the imaging device 30 and the information processing terminal 10 are compressed in some cases.

Accordingly, an example of a structure in which a captured moving image is efficiently transmitted to the information processing terminal 10 via the network n11 (that is, traffic of the network n11 is reduced) when the imaging device 30 is caused to capture the moving image in the information processing system 1 according to Example 3 will be described with reference to FIG. 20. FIG. 20 is an explanatory diagram illustrating an overview of the information processing system 1 according to Example 3.

In FIG. 20, reference numeral d10 schematically denotes a moving image captured by the imaging device 30 and the horizontal direction of the drawing represents a time axis. In addition, reference numerals d30a to d30d schematically illustrate a partial moving image obtained by cutting the moving image d10 along the time axis. In addition, reference numerals d31a to d31d schematically illustrate some frames (that is, still images) in the moving image d10. Moreover, when moving image d30a to d30d are not particularly distinguished, the moving image d30a to d30d are simply referred to as the "moving image d30" in some cases. Similarly, when the frames d31a to d31d are not particularly distinguished from each other, the frames d31a to d31d are simply referred to as "frames d31" in some cases.

The imaging device 30 according to the present embodiment retains or records a series of captured images (that is, the moving image d10) on, for example, a recording medium such as the storage unit 37 when the imaging device 30 ends the capturing of the moving image based on an instruction from the information processing terminal 10.

When the imaging device 30 ends the capturing of the moving image d10 based on the instruction from the information processing terminal 10, the imaging device 30 extracts a plurality of some frames from the captured moving image d10. In the example illustrated in FIG. 20, the imaging device 30 extracts the frames d31a to d31d from the moving image d10. Then, the imaging device 30 generates thumbnail images of the extracted frames d31a to d31d and transmits the series of generated thumbnail images to the information processing terminal 10 via the network n11.

Moreover, the imaging device 30 may appropriately change a method of extracting some of the frames (for example, the frames d31a to d31d) from the captured moving image d10 according to implementation. As a specific example, the imaging device 30 may extract some of the frames from the moving image d10 for each predetermined time width. In addition, as another example, the imaging device 30 may analyze the frames of the moving image d10 and extract a frame for each scene using a timing at which the scene is considerably changed as a starting point. Of course, the method of extracting the frames described above is merely an example and the present disclosure is not limited to the foregoing example. In addition, the imaging device 30 may combine a plurality of methods and extract some of the frames from the moving image d10.

When the information processing terminal 10 acquires the series of thumbnail images from the imaging device 30, the information processing terminal 10 causes the display unit 151 to display the acquired thumbnail images so that the thumbnail images can each be selected. At this time, for example, the information processing terminal 10 causes the display unit 151 to display the list v30 presented so that the acquired thumbnail images can each be selected, as in the case of the above-described embodiment with reference to FIG. 18. For example, reference numerals v31a to v31d denote thumbnail images of the frames d31a and d31d. Moreover, when the thumbnail images v31a to v31d are not particularly distinguished from each other, the thumbnail images v31a to v31d are simply referred to as "thumbnail images v31" in some cases.

Then, the information processing terminal 10 receives selection of at least some of the thumbnail images among the series of thumbnail images v31 presented via the display unit 151 from the user. Then, when the information processing terminal 10 receives the selection of at least some of the thumbnail images v33 among the series of thumbnail images v31 presented via the display unit 151, the information processing terminal 10 instructs the imaging device 30 to transmit the moving image corresponding to the selected thumbnail images v33. Moreover, the thumbnail image v30b among the thumbnail images v30a to v30d in the list v30 is assumed to be designated in the description here.

The imaging device 30 receiving an instruction form the information processing terminal 10 specifies a frame corresponding to the designated thumbnail image v31 from the frames d31 which are generation sources of the series of thumbnail images v31 in the captured moving image d10. That is, when the thumbnail image v31b is designated, the imaging device 30 specifies the frame d31b which is a generation source of the thumbnail image v31b.

Then, the imaging device 30 extracts the partial moving image d30 including the specified frame d31 from the captured moving image d10. For example, when the frame d31b is specified, the imaging device 30 extracts the partial moving image d30b including the frame d31b from the captured moving image d10.

Moreover, the method of setting the time width of the moving image d30 when the imaging device 30 extracts the partial moving image d30 from the moving image d10 is not particularly limited. As a specific example, the imaging device 30 may extract the partial moving image d30 with the predetermined time width including the specified frame d31 from the captured moving image d10. In addition, as another example, the imaging device 30 may extract the partial moving image d30 from the specified frame d31 to another frame d31 adjacent to the frame d31 from the specified frame d31. Of course, the foregoing method is merely an example and the method is not particularly limited as long as the imaging device 30 can extract the partial moving image d30 including the specified frame d31 from the moving image d10.

When the imaging device 30 extracts the partial moving image d30 from the captured moving image d10 based on the specified frame d31, the imaging device 30 transmits the partial moving image d30 to the information processing terminal 10 via the network n11.

In the above-described configuration, in the information processing system 1 according to Example 3, the moving image d10 captured by the imaging device 30 can be transmitted from the imaging device 30 to the information processing terminal 10 with only the partial moving image including the frame d31 selected by the user not being reduced. Therefore, in the information processing system 1 according to Example 3, traffic between the imaging device 30 and the information processing terminal 10 is reduced more than when all of the moving image d10 captured by the imaging device 30 is transmitted to the information processing terminal 10 without being reduced. That is, in the information processing system 1 according to Example 3, the captured moving image can be efficiently transmitted between the imaging device 30 and the information processing terminal 10.

3.4. Conclusion

As described above, in the information processing system 1 according to the present embodiment, the series of images captured by the imaging device 30 can be transmitted from the imaging device 30 to the information processing terminal 10 with only the images selected by the user not being reduced. Therefore, in the information processing system 1 according to the present embodiment, traffic between the imaging device 30 and the information processing terminal 10 is reduced more than when all of the series of images captured by the imaging device 30 is transmitted to the information processing terminal 10 without being reduced. That is, in the information processing system 1 according to the present embodiment, the captured images can be efficiently transmitted between the imaging device 30 and the information processing terminal 10.

4. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing device including:
a display control unit configured to control a display unit such that a slider configured so that a display object is movable between a plurality of positions set along a predetermined axis is displayed in a part of a display screen; and
a process execution unit configured to receive an operation of moving the display object to at least one position among the plurality of positions and control an operation of the imaging unit based on a pre-decided operation mode.

(2)
The information processing device according to (1),
wherein the process execution unit receives an operation of moving the display object from a first position which is one of the plurality of positions to a second position different from the first position among the plurality of positions, and starts control of an operation of the imaging unit based on the operation mode.

(3)
The information processing device according to (2),
wherein the process execution unit receives an operation of moving the display object from the second position to the first position and ends the started control of the operation of the imaging unit based on the operation mode.

(4)
The information processing device according to (3),
wherein the display control unit receives an operation via a second operation unit for operating the imaging unit and moves the display object, the second operation unit being different from a first operation unit receiving an operation of moving the display object.

(5)
The information processing device according to (4),
wherein the display control unit receives an operation of starting the control of the operation of the imaging unit based on the operation mode via the second operation unit, and executes control such that the display object located at the first position is moved to the second position.

(6)
The information processing device according to (4),
wherein the display control unit receives an operation of ending the started control of the operation of the imaging unit based on the operation mode via the second operation unit, and executes control such that the display object located at the second position is moved to the first position.

(7)
The information processing device according to any one of (2) to (6),
wherein the process execution unit receives an operation of maintaining a state in which the display object located at the first position is selected using an operation object and controls an operation of the imaging unit so that the imaging unit transitions to a preparation state for capturing an image, and
the process execution unit receives an operation of moving the display object selected using the operation object from the first position to the second position and causes the imaging unit to capture an image based on the predetermined operation mode.

(8)
The information processing device according to (7),
wherein the process execution unit causes the imaging unit transitioning to the preparation state to control a focus position of an imaging photochemical system imaging a subject.

(9)
The information processing device according to any one of (1) to (8),
wherein the operation mode is set in advance based on an instruction from a user via an operation unit.

(10)
The information processing device according to any one of (2) to (8),
wherein the slider is configured such that the display object is movable between the first position and each of a plurality of the second positions,
each of the second positions is associated in advance with one operation mode among a plurality of the operation modes, and
the process execution unit receives an operation of moving the display object from the first position to one of the plurality of second positions and controls the operation of the imaging unit based on the operation mode associated with the second position which is a movement destination of the display object.

(11)

The information processing device according to any one of (1) to (10),
wherein the slider is configured such that the display object is movable between a plurality of positions disposed along a first axis and a plurality of positions disposed along a second axis different from the first axis, and
the process execution unit controls an operation of the imaging unit based on mutually different operation modes between a case of reception of an operation of moving the display object to the position disposed along the first axis and a case of reception of an operation of moving the display object to the position disposed along the second axis.

(12)

The information processing device according to any one of (1) to (11),
wherein the operation mode includes a mode in which the imaging unit is caused to continuously capture a plurality of still images as a series of images.

(13)

The information processing device according to any one of (1) to (11),
wherein the operation mode includes a mode in which the imaging unit is caused to execute bulb photography capable of instructing to start and end exposure.

(14)

The information processing device according to any one of (1) to (11),
wherein the operation mode includes a mode in which the imaging unit is caused to capture a moving image.

(15)

The information processing device according to any one of (1) to (14),
wherein the process execution unit controls, via a network, an operation of the imaging unit installed in an external device connected via the network.

(16)

The information processing device according to any one of (1) to (14),
wherein the process execution unit controls an operation of the imaging unit installed in a same casing.

(17)

The information processing device according to any one of (1) to (16),
wherein the display control unit receives an operation of moving the display object in a direction oriented from a position among the mutually adjacent positions to the other position and moves the display object to the position when a movement amount of the display object is less than a threshold.

(18)

The information processing device according to any one of (1) to (17),
wherein the display control unit controls the display of the slider according to an attachment or detachment state of a portable auxiliary storage medium to or from the device, the portable auxiliary storage medium being configured to be detachably mounted on a device that records data of an image captured by the imaging unit.

(19)

A program causing a computer to execute:
controlling a display unit such that a slider configured so that a display object is movable between a plurality of positions set along a predetermined axis is displayed in a part of a display screen; and
receiving an operation of moving the display object to at least some positions among the plurality of positions and controlling an operation of the imaging unit based on a pre-decided operation mode.

(20)

An information processing method including:
controlling a display unit such that a slider configured so that a display object is movable between a plurality of positions set along a predetermined axis is displayed in a part of a display screen; and
receiving, by a processor, an operation of moving the display object to at least one position among the plurality of positions and controlling an operation of the imaging unit based on a pre-decided operation mode.

REFERENCE SIGNS LIST 1 information processing system
10 information processing terminal
11 control unit
111 process execution unit
113 display control unit
13 communication unit
15 UI
151 display unit
153 operation unit
30 imaging device
31 control unit
311 process execution unit
313 transmission control unit
33 communication unit
35 imaging unit
37 storage unit
39 operation unit

The invention claimed is:

1. An information processing device comprising:
control circuitry configured to:
control a touch screen display to display a touch graphical user interface (GUI) including a movable display object on a slider including a first position, a second position, and a third position, each position associated with a different operation mode of the information processing device;
controlling an image sensor to begin capturing one or more images in a continuous shoot mode in response to detecting a movement of a user finger from the first position on the touch screen display to the third position on the touch screen display, and
controlling the touch screen display to display an animation moving the movable display object to the first position in response to detecting a ceasing of a touching of the touch screen display,
wherein a display of the GUI other than the movable display object is configured to rotate when the touch screen display is switched between a vertical orientation and a horizontal orientation, but a direction of detecting the movement of the user finger from the first position to the second position and from the first position to the third position with respect to the touch screen display does not change when the GUI is switched between the vertical orientation and the horizontal orientation.

2. The information processing device of claim 1, wherein the control circuitry is further configured to operate a first operation in response to detecting a maintaining of a touching of the touch screen display at the first position for a predetermined amount of time.

3. The information processing device of claim 1, wherein the control circuitry is further configured to stop capturing the one or more images in a second imaging mode in response to detecting the ceasing of the touching of the touch screen display.

4. The information processing device of claim 1, wherein the control circuitry is further configured to end capturing the one or more images in the continuous shoot mode in response to detecting the ceasing of the touching of the touch screen display.

5. The information processing device of claim 1, wherein the control circuitry is further configured to move the movable display object back toward the first position in response to detecting a ceasing of touching of the touch screen display.

6. The information processing device of claim 1, wherein the movable display object is initially displayed near a home button of the touch GUI.

7. The information processing device of claim 1, wherein the touch GUI includes a settings icon.

8. The information processing device of claim 1, wherein the touch GUI includes an icon for setting a camera imaging mode.

9. The information processing device of claim 1, wherein the touch GUI displays an icon for changing a zoom magnification of the image sensor.

10. The information processing device of claim 1, wherein the touch GUI is displayed on a first portion of the touch screen display, and a through-image preview is shown on a second portion of the touch screen display, the second portion being distinct from the first portion.

11. The information processing device of claim 1, wherein the touch GUI includes an icon for setting a camera imaging mode and an icon for changing a zoom magnification of the image sensor, and
wherein the touch GUI is displayed on a first portion of the touch screen display, and a through-image preview is shown on a second portion of the touch screen display, the second portion being distinct from the first portion.

12. A non-transitory computer-readable medium storing instructions that, when executed by a processor, cause the processor to execute operations comprising:
displaying a touch graphical user interface (GUI) including a movable display object on a slider including a first position, a second position, and a third position on a touch screen display, each position associated with a different operation mode of an information processing device;
controlling an image sensor to begin capturing one or more images in a continuous shoot mode in response to detecting a movement of a user finger, in a first direction of operation of the movable display object with respect to the touch screen display, from the first position on the touch screen display to the third position on the touch screen display, and
controlling the touch screen display to display an animation moving the movable display object to the first position in response to detecting a ceasing of a touching of the touch screen display,
wherein a display of the GUI other than the movable display object is configured to rotate when the touch screen display is switched between a vertical orientation and a horizontal orientation, but a direction of detecting the movement of the user finger from the first position to the second position and from the first position to the third position with respect to the touch screen display does not change when the GUI is switched between the vertical orientation and the horizontal orientation.

13. The non-transitory computer-readable medium of claim 12, the operations further comprise:
operating a first operation in response to detecting a maintaining of a touching of the touch screen display at the first position for a predetermined amount of time.

14. The non-transitory computer-readable medium of claim 12, the operations further comprise:
stopping capture of the one or more images in a second imaging mode in response to detecting the ceasing of the touching of the touch screen display.

15. The non-transitory computer-readable medium of claim 12, the operations further comprise:
end capturing the one or more images in the continuous shoot mode in response to detecting the ceasing of the touching of the touch screen display.

16. The non-transitory computer-readable medium of claim 12, the operations further comprise:
moving the movable display object back toward the first position in response to detecting the ceasing of the touching the touch screen display.

17. The non-transitory computer-readable medium of claim 12, wherein the movable display object is initially displayed near a home button of the touch GUI.

18. The non-transitory computer-readable medium of claim 12, wherein the touch GUI includes a settings icon.

19. The non-transitory computer-readable medium of claim 12, wherein the touch GUI includes an icon for setting a camera imaging mode.

20. The non-transitory computer-readable medium of claim 12, wherein the touch GUI displays an icon for changing a zoom magnification of the image sensor.

21. The non-transitory computer-readable medium of claim 12, wherein the touch GUI is displayed on a first portion of the touch screen display, and a through-image preview is shown on a second portion of the touch screen display, the second portion being distinct from the first portion.

22. The non-transitory computer-readable medium of claim 12, wherein the touch GUI includes an icon for setting a camera imaging mode and an icon for changing a zoom magnification of the image sensor, and
wherein the touch GUI is displayed on a first portion of the touch screen display, and a through-image preview is shown on a second portion of the touch screen display, the second portion being distinct from the first portion.

23. An information processing method comprising:
displaying a touch graphical user interface (GUI) including a movable display object on a slider including a first position, a second position, and a third position on a touch screen display, each position associated with a different operation mode of an information processing device;
and,
instructing an image sensor to begin capturing one or more images in a continuous shoot mode in response to detecting a first operation of a movement of a user finger from the first position on the touch screen display to the third position on the touch screen display, and
controlling the touch screen display to display an animation moving the movable display object to the first position in response to detecting a second operation of removal of the user finger from the touch screen display during capturing the one or more images in the continuous shoot mode, wherein a display of the GUI other than the movable display object is configured to rotate when the touch screen display is switched between a vertical orientation and a horizontal orientation, but a direction of detecting the first operation of the movement of the user finger from the first position to the second position and from the first position to the third position with respect to the touch screen display does not change when the GUI is switched between the vertical orientation and the horizontal orientation.

24. The information processing method of claim 23, further comprising:
   operating a first operation in response to detecting the operation of maintaining a touching of the touch screen display for a predetermined amount of time.

25. The information processing method of claim 23, further comprising:
   stopping capture of the one or more images in a second imaging mode in response to detecting a ceasing of the touching the touch screen display.

26. The information processing method of claim 23, further comprising:
   ending the continuous shoot mode in response to detecting a ceasing of touching of the touch screen display.

27. The information processing method of claim 23, further comprising:
   moving the movable display object back toward the first position in response to detecting a ceasing of touching of the touch screen display.

28. The information processing method of claim 23, wherein the movable display object is displayed initially near a home button of the touch GUI.

29. The information processing method of claim 23, wherein the touch GUI includes a settings icon.

30. The information processing method of claim 23, wherein the touch GUI includes an icon for setting a camera imaging mode.

31. The information processing method of claim 23, wherein the touch GUI displays an icon for changing a zoom magnification of the image sensor.

32. The information processing method of claim 23, wherein the touch GUI is displayed on a first portion of the touch screen display, and a through-image preview is shown on a second portion of the touch screen display, the second portion being distinct from the first portion.

33. The information processing method of claim 23, wherein the touch GUI includes an icon for setting a camera imaging mode and an icon for changing a zoom magnification of the image sensor, and
   wherein the touch GUI is displayed on a first portion of the touch screen display, and a through-image preview is shown on a second portion of the touch screen display, the second portion being distinct from the first portion.

* * * * *